United States Patent [19]
Inoue

[11] Patent Number: 6,151,286
[45] Date of Patent: Nov. 21, 2000

[54] METHOD AND APPARATUS FOR RECORDING COMPRESSED AUDIO DATA ON RECORDING MEDIUM AND METHOD FOR TRANSFERRING COMPRESSED AUDIO DATA

[75] Inventor: Hiraku Inoue, Kanagawa, Japan

[73] Assignee: Sony Corporation, Tokyo, Japan

[21] Appl. No.: 09/084,415

[22] Filed: May 27, 1998

[30] Foreign Application Priority Data

| May 29, 1997 | [JP] | Japan | 9-140596 |
| Aug. 19, 1997 | [JP] | Japan | 9-222724 |

[51] Int. Cl.[7] .................................................. G11B 3/64
[52] U.S. Cl. ................................................. 369/84; 360/15
[58] Field of Search .................................. 369/84, 47, 48, 369/54, 58, 124.06, 124.04, 124.09, 32, 59; 386/54, 96, 109

[56] References Cited

U.S. PATENT DOCUMENTS

| 5,331,617 | 7/1994 | Fuma et al. | 369/84 |
| 5,402,406 | 3/1995 | Fuma et al. | 369/84 |
| 5,428,598 | 6/1995 | Veldhius et al. | 369/84 |
| 5,485,447 | 1/1996 | Minoda | 369/84 |
| 5,930,768 | 7/1999 | Hooban | 369/84 |
| 5,982,977 | 11/1999 | Naruse et al. | 360/15 |

FOREIGN PATENT DOCUMENTS

| 0361454 | 4/1990 | European Pat. Off. . |
| 000535703A | 4/1993 | European Pat. Off. . |

*Primary Examiner*—Thang V. Tran
*Attorney, Agent, or Firm*—Jay H. Maioli

[57] ABSTRACT

A dubbing system in which a plurality of music programs are compressed in a predetermined manner and stored in a server and in which a client selects a desired one of the music programs which is transferred in a compressed state to the client for dubbing on a recording medium. The dubbing system is subservient to the selection of musical programs by the client since a portion of the compressed music program can be expanded and monitored on the client side so that the client can check to see that the music program is the desired one. Moreover, the audio program to be dubbed next can be monitored.

16 Claims, 27 Drawing Sheets

|   | 16BITS | | 16BITS | |
|---|---|---|---|---|
|   | MSB    LSB | MSB    LSB | MSB    LSB | MSB    LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | CLUSTER H | CLUSTER L | 00000000 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | MAKER CODE | MODEL CODE | FIRST TNO | LAST TNO |
| 8 | 00000000 | 00000000 | 00000000 | USED SECTORS |
| 9 | 00000000 | 00000000 | 00000000 | 00000000 |
| 10 | 00000000 | 00000000 | 00000000 | DISC SERIAL NO |
| 11 | DISC | ID | P-DFA | P-EMPTY |
| 12 | P-FRA | P-TNO1 | P-TNO2 | P-TNO3 |
| 13 | P-TNO4 | P-TNO5 | P-TNO6 | P-TNO7 |
| 74 | P-TNO248 | P-TNO249 | P-TNO250 | P-TNO251 |
| 75 | P-TNO252 | P-TNO253 | P-TNO254 | P-TNO255 |
| 76 | 00000000 | 00000000 | 00000000 | 00000000 |
| 77 | 00000000 | 00000000 | 00000000 | 00000000 |
| 78 | START ADDRES | | | TRACK MODE |
| 79 | END ADDRESS | | | LINK INFORMATION |
| 80 | START ADDRES | | | TRACK MODE |
| 81 | END ADDRESS | | | LINK INFORMATION |
| 82 | START ADDRES | | | TRACK MODE |
| 83 | END ADDRESS | | | LINK INFORMATION |
| 580 | START ADDRESS | | | TRACK MODE |
| 581 | END ADDRESS | | | LINK INFORMATION |
| 582 | START ADDRESS | | | TRACK MODE |
| 583 | END ADDRESS | | | LINK INFORMATION |
| 584 | START ADDRESS | | | TRACK MODE |
| 585 | END ADDRESS | | | LINK INFORMATION |
| 586 | START ADDRESS | | | TRACK MODE |
| 587 | END ADDRESS | | | LINK INFORMATION |

FIG.4

|   | 16BITS | | 16BITS | |
|---|---|---|---|---|
|   | MSB      LSB | MSB      LSB | MSB      LSB | MSB      LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | CLUSTER H | CLUSTER L | 00000000 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TNA1 | P-TNA2 | P-TNA3 |
| 13 | P-TNA4 | P-TNA5 | P-TNA6 | P-TNA7 |
| 74 | P-TNA248 | P-TNA249 | P-TNA250 | P-TNA251 |
| 75 | P-TNA252 | P-TNA253 | P-TNA254 | P-TNA255 |
| 76 | DISC NAME | | | |
| 77 | DISC NAME | | LINK INFORMATION | |
| 78 | DISC NAME/TRACK NAME | | | |
| 79 | DISC NAME/TRACK NAME | | LINK INFORMATION | |
| 80 | DISC NAME/TRACK NAME | | | |
| 81 | DISC NAME/TRACK NAME | | LINK INFORMATION | |
| 82 | DISC NAME/TRACK NAME | | | |
| 83 | DISC NAME/TRACK NAME | | LINK INFORMATION | |
| 584 | DISC NAME/TRACK NAME | | | |
| 585 | DISC NAME/TRACK NAME | | LINK INFORMATION | |
| 586 | DISC NAME/TRACK NAME | | | |
| 587 | DISC NAME/TRACK NAME | | LINK INFORMATION | |

FIG.8

|  | 16BITS | | 16BITS | |
|---|---|---|---|---|
|  | MSB         LSB | MSB         LSB | MSB         LSB | MSB         LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | CLUSTER H | CLUSTER L | 00000000 | 00000000 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TRD1 | P-TRD2 | P-TRD3 |
| 13 | P-TRD4 | P-TRD5 | P-TRD6 | P-TRD7 |
| 14 | P-TRD8 | P-TRD9 | P-TRD10 | P-TRD11 |
| 15 | P-TRD12 | P-TRD13 | P-TRD14 | P-TRD15 |
| 16 | P-TRD16 |  |  |  |
| 17 |  |  |  |  |
| 73 |  |  |  |  |
| 74 | P-TRD248 | P-TRD249 | P-TRD250 | P-TRD251 |
| 75 | P-TRD252 | P-TRD253 | P-TRD254 | P-TRD255 |
| 76 | RECORDING DATE AND TIME | | | |
| 77 |  |  | MAKER CODE | MODEL CODE |
| 78 | RECORDING DATE AND TIME | | | |
| 79 |  |  | MAKER CODE | MODEL CODE |
| 80 | RECORDING DATE AND TIME | | | |
| 81 |  |  | MAKER CODE | MODEL CODE |
| 82 | RECORDING DATE AND TIME | | | |
| 83 |  |  | MAKER CODE | MODEL CODE |
| 84 | RECORDING DATE AND TIME | | | |
| 85 |  |  |  | LINK INFORMATION |
| 86 |  |  |  |  |
| 586 | RECORDING DATE AND TIME | | | |
| 587 |  |  |  | LINK INFORMATION |

FIG.9

| | 16BITS | | 16BITS | |
|---|---|---|---|---|
| | MSB　　　LSB | MSB　　　LSB | MSB　　　LSB | MSB　　　LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | CLUSTER H | CLUSTER L | 00000000 | 00000000 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TNA1 | P-TNA2 | P-TNA3 |
| 13 | P-TNA4 | P-TNA5 | P-TNA6 | P-TNA7 |
| 14 | P-TNA8 | P-TNA9 | P-TNA10 | P-TNA11 |
| 15 | P-TNA12 | P-TNA13 | P-TNA14 | P-TNA15 |
| 16 | P-TNA16 | | | |
| 17 | | | | |
| 73 | | | | |
| 74 | P-TNA248 | P-TNA249 | P-TNA250 | P-TNA251 |
| 75 | P-TNA252 | P-TNA253 | P-TNA254 | P-TNA255 |
| 76 | DISC NAME | | | |
| 77 | DISC NAME | | | LINK INFORMATION |
| 78 | DISC NAME OR TRACK NAME | | | |
| 79 | DISC NAME OR TRACK NAME | | | LINK INFORMATION |
| 80 | DISC NAME OR TRACK NAME | | | |
| 81 | DISC NAME OR TRACK NAME | | | LINK INFORMATION |
| 82 | DISC NAME OR TRACK NAME | | | |
| 83 | DISC NAME OR TRACK NAME | | | LINK INFORMATION |
| 84 | DISC NAME OR TRACK NAME | | | |
| 85 | DISC NAME OR TRACK NAME | | | LINK INFORMATION |
| 86 | DISC NAME OR TRACK NAME | | | |
| 586 | DISC NAME OR TRACK NAME | | | |
| 587 | DISC NAME OR TRACK NAME | | | LINK INFORMATION |

FIG.10

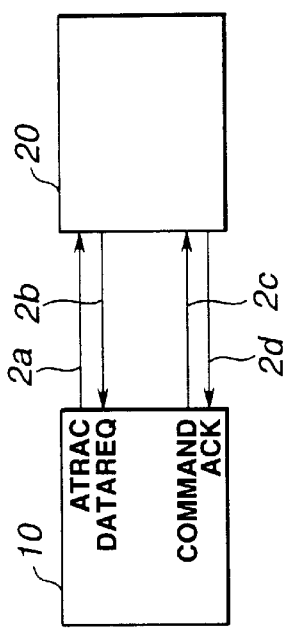
FIG.12A
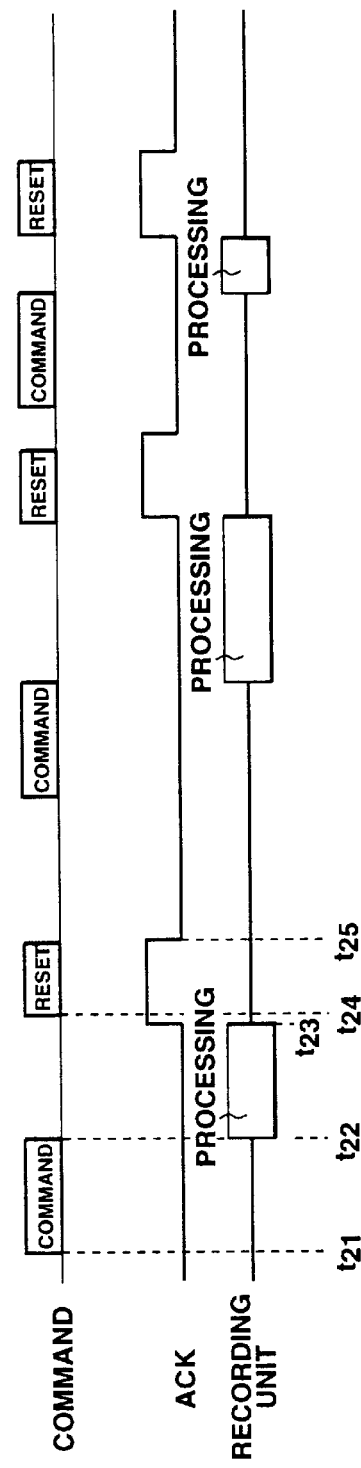
FIG.12B
FIG.12C

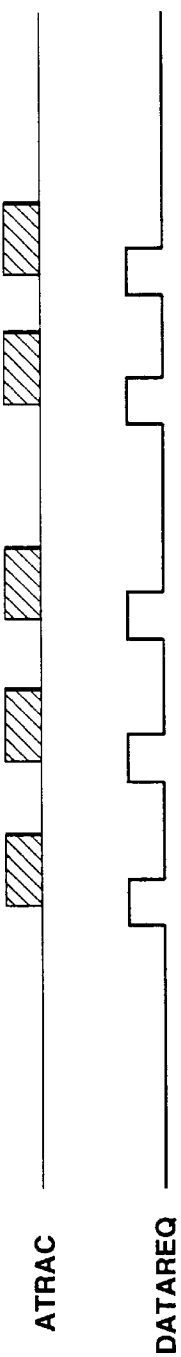
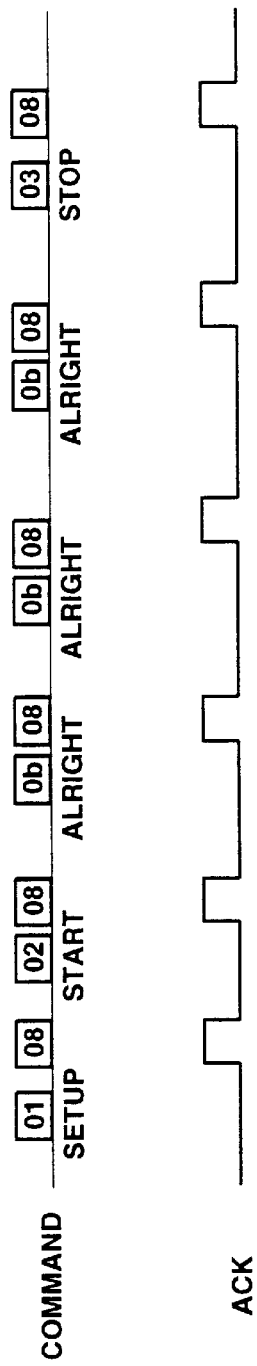
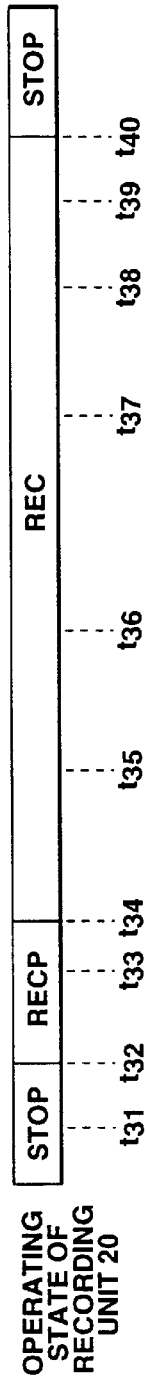

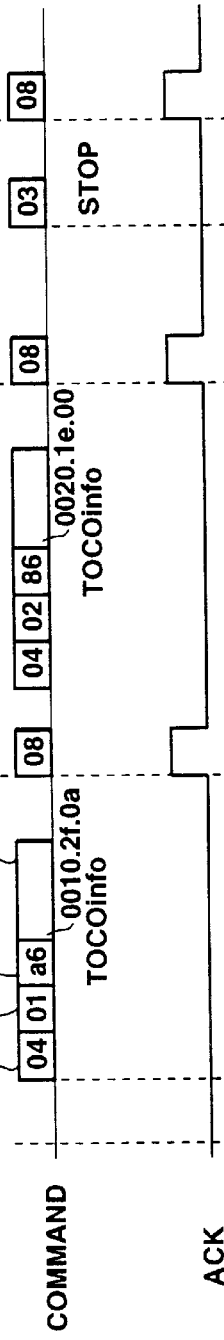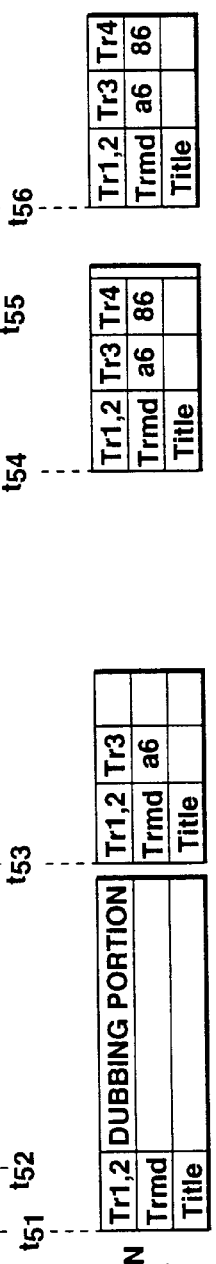

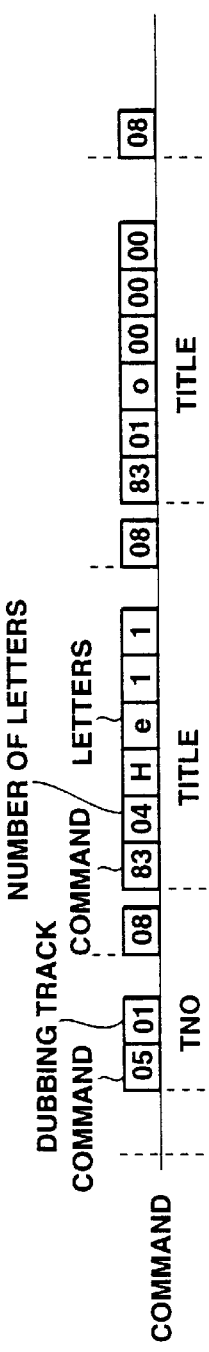
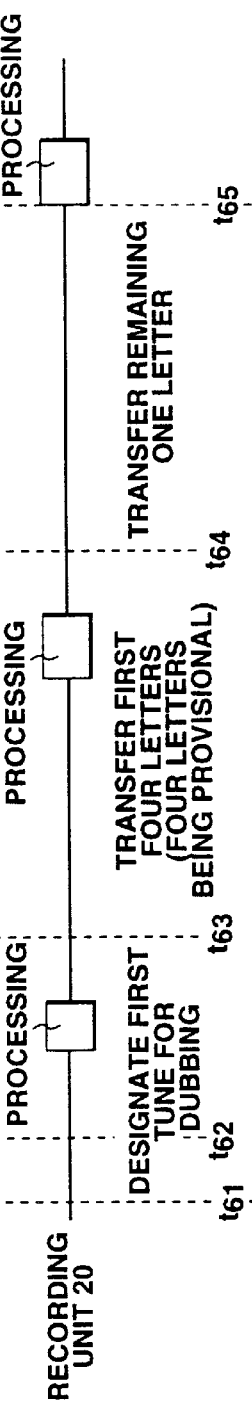
FIG.17A
FIG.17B
FIG.17C
FIG.17D

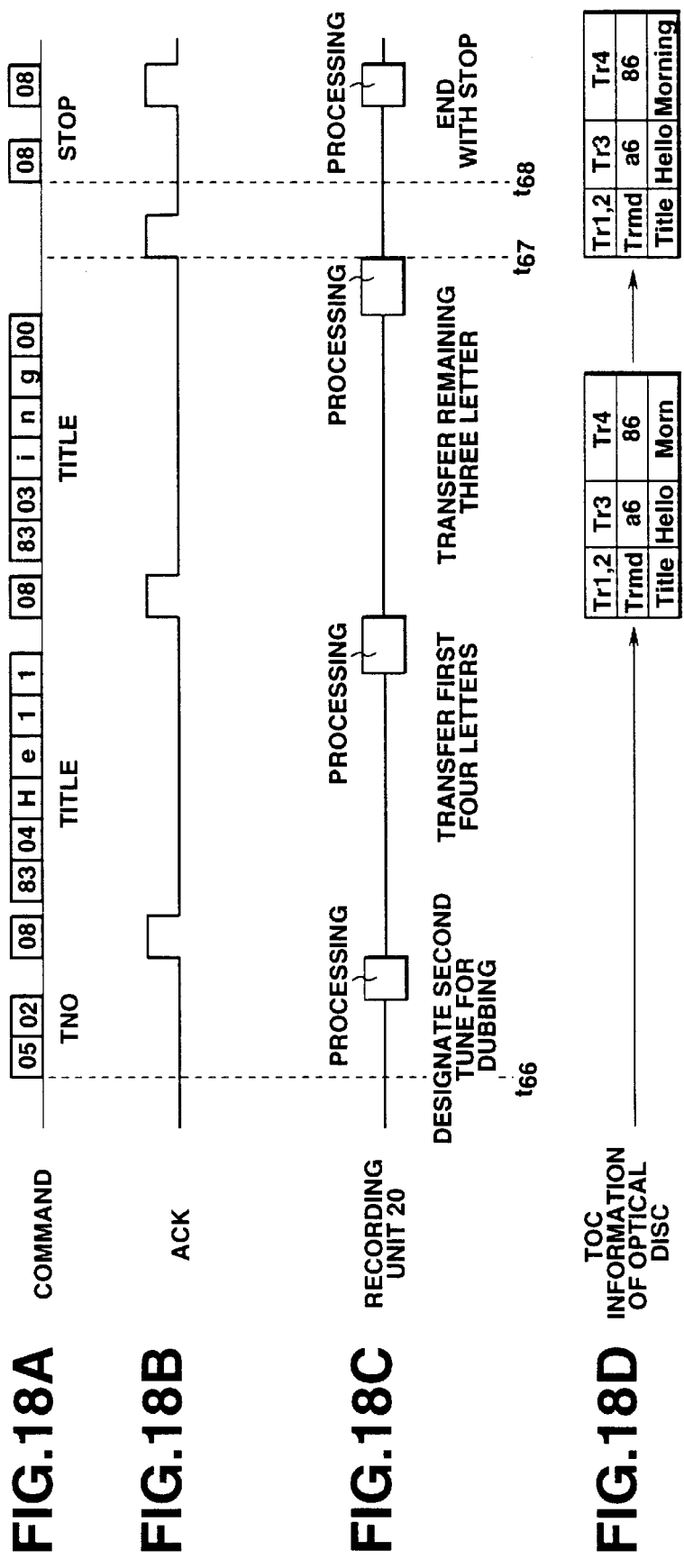

| TNO | TITLE | TRMD | TRACKSIZE |
|-----|---------|------|-------------|
| Tr1 | EMOTION | e6 | 0011.05.02 |
| Tr2 | DREAM | e6 | 0022.1f.0a |
| Tr3 | HELLO | a6 | 0010.2f.0a |
| Tr4 | MORNING | 86 | 0020.1e.00 |

FIG.19

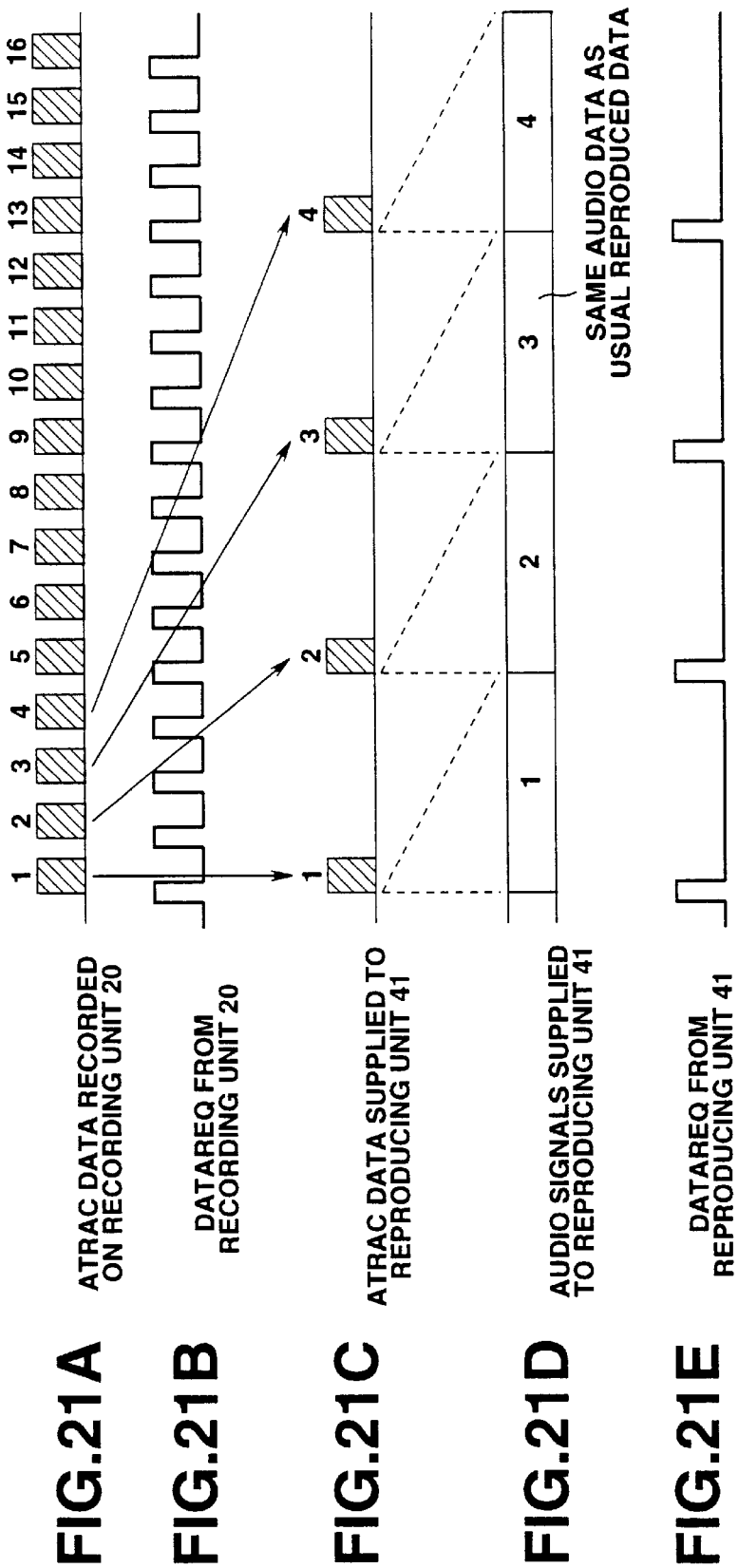

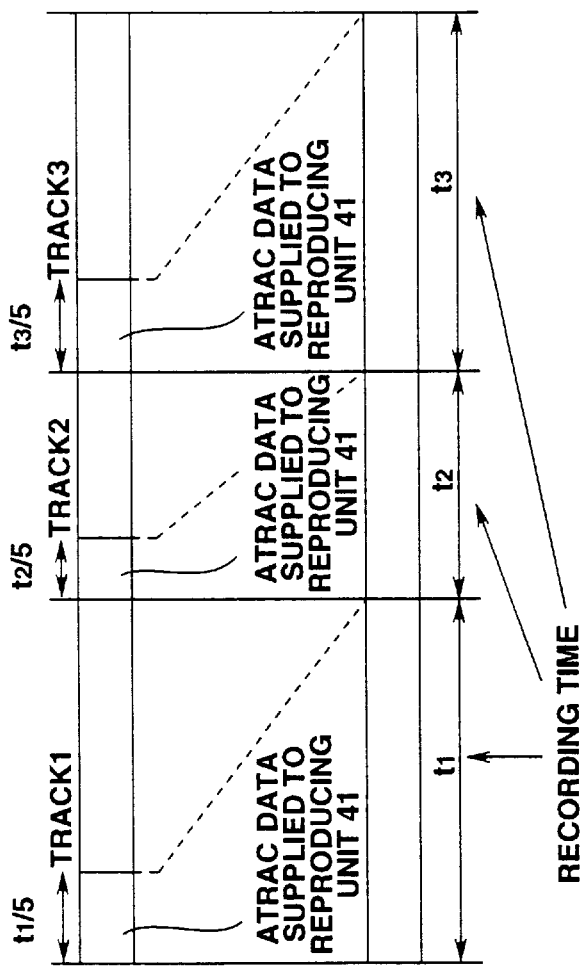

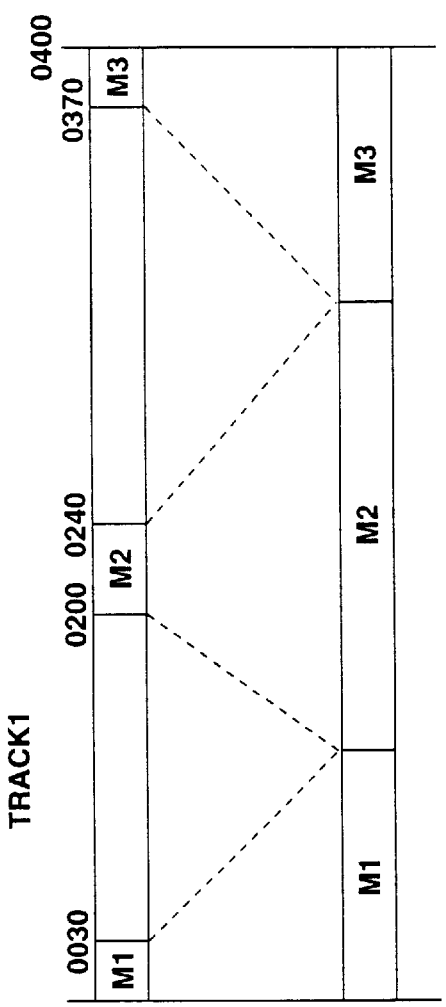

| TRACK1 | NUMBER OF UNITS=3 | M1=0000-0030<br>M2=0200-0240<br>M3=0370-0400 |
|---|---|---|
| TRACK2 | NUMBER OF UNITS=4 | M1=0000-0040<br>M2=0210-0250<br>M3=0270-0280<br>M4=0470-0500 |
|  |  |  |
| TRACKn | NUMBER OF UNITS=2 |  |

FIG.26

| TRACK1 | MONITER | NUMBER OF UNITS=3 | M1=0000-0030<br>M2=0200-0240<br>M3=0370-0400 |
|---|---|---|---|
| | PHOTO | TRACK1,BMP | |
| | TEXT | TRACK1,TXT | |
| | VIDEO CD | CHAPTER1 | |
| | URL | http;//www.xxx.oo.jp/track1.htm | |
| TRACK2 | MONITER | NUMBER OF UNITS=4 | M1=0000-0040<br>M2=0210-0250<br>M3=0270-0280<br>M4=0470-0500 |
| | PHOTO | TRACK2,BMP | |
| | TEXT | TRACK2,TXT | |
| | VIDEO CD | CHAPTER2 | |
| | URL | http;//www.xxx.oo.jp/track2.htm | |
| | | | |
| TRACKn | MONITER | | |
| | PHOTO | TRACKn,BMP | |
| | TEXT | TRACKn,TXT | |
| | VIDEO CD | CHAPTERn | |
| | URL | http;//www.xxx.oo.jp/trackn.htm | |

FIG.29

METHOD AND APPARATUS FOR RECORDING COMPRESSED AUDIO DATA ON RECORDING MEDIUM AND METHOD FOR TRANSFERRING COMPRESSED AUDIO DATA

BACKGROUND OF THE INVENTION

Field of the invention

This invention relates to a method and apparatus for recording compressed audio data on recording medium and a method for transferring compressed audio data. More particularly, it relates to a method and apparatus for recording audio data on a recording medium and a method for transferring audio data, in which the recorded data can be random-accessed using the TOC information.

There has so far been known a magneto-optical disc, termed a mini-disc (trademark) which is a recordable and reproducible disc-shaped recording medium of approximately 64 mm in diameter housed within a cartridge. This magneto-optical disc can record stereo audio signals continuing for about 74 minutes in accordance with the Adaptive Transform Acoustic Coding (ATRAC) system. This magneto-optical disc can duplicate audio data because it can record the information in distinction from the conventional digital audio disc known as a compact disc (trademark).

Similarly to the conventional digital audio disc, the magneto-optical disc permits random accessing to the audio data recorded thereon, because an area for Table-Of-Contents information (TOC information) for supervising the recorded audio data is provided in this magneto-optical disc in addition to an area for recording audio data. Therefore, if audio data is overwritten on the magneto-optical disc carrying recorded audio data, it is possible to erase or edit musical numbers without rewriting actual audio data.

There may be envisaged an audio dubbing system in which, for recording audio data compressed to approximately ⅕ on a magneto-optical disc, compressed audio data are directly stored in a server and read out therefrom so as to be recorded without processing the compressed data with decoding or encoding.

In this audio dubbing system, since the compressed data are recorded directly, the recording time is shorter than if the audio data is expanded once and recorded as it is reproduced.

However, the recording contents cannot be confirmed because the compressed data is dubbed without expansion.

SUMMARY OF THE INVENTION

It is an object of the present invention to provide a recording method and apparatus whereby, in recording compressed audio data on a magneto-optical disc, the audio data can be recorded on the magnetic disc as the recording contents are confirmed.

It is another object of the present invention to provide a recording method and apparatus and a transferring method for audio data in which, as a configuration for purveying contents, such as audio, employing the magneto-optical disc, plural audio data are previously stored in a server and only audio data of the contents desired by the user are read out from the server for recording on a magneto-optical disc owned by the user.

In one aspect, the present invention provides a dubbing system including storage means for storing a plurality of audio programs compressed by predetermined compression processing, selection means for selecting a predetermined audio program from the audio programs, transferring means for transferring the audio program selected by the selection means, expanding means for expanding such audio program which is supplied from the storage means, recording means for recording the predetermined audio program supplied from the transferring means and monitoring means for monitoring the expanded audio program supplied from the expanding means while the predetermined audio program is being recorded on a recording medium.

In another aspect, the present invention provides a dubbing method including selecting a predetermined compressed audio program from a plurality of compressed audio programs stored in a memory, receiving the compressed audio program from a server in accordance with the selecting step, expanding such compressed audio program which is supplied from the server, recording the compressed audio program which is supplied from the server and monitoring the expanded audio program while the predetermined audio program is being recorded on a recording medium.

With the audio data recording apparatus of the present invention, audio data corresponding to the compressed audio data recorded by recording means is expanded and reproduced by reproducing means during recording of the audio data by the recording means to permit comprehension of the audio data being recorded during recording.

With the audio data recording apparatus of the present invention, part of the audio data to be recorded can be selected and reproduced.

With the audio data recording apparatus of the present invention, the pertinent information relevant to the audio data to be recorded can be checked during recording.

With the audio data recording method according to the present invention, audio data corresponding to the compressed audio data for recording can be expanded and reproduced to permit the comprehension of the audio data being recorded during recording.

With the audio data recording method according to the present invention, if plural audio data are recorded, thee respective audio can be discriminated from one another.

With the audio data recording method according to the present invention, part of the audio data for recording can be selected and reproduced.

With the audio data recording method according to the present invention, the pertinent information relevant to the audio data for recording can be checked during recording.

BRIEF DESCRIPTION OF THE DRAWINGS

FIG. 4 shows the data structure for a U-TOC sector 0 which is a management area on a magneto-optical disc embodying the present invention.

FIG. 8 shows a data structure for a U-TOC sector 1 which is a management area on a magneto-optical disc embodying the present invention.

FIG. 9 shows a data structure for a U-TOC sector 2 which is a management area on a magneto-optical disc embodying the present invention.

FIG. 10 shows a data structure for a U-TOC sector 4 which is a management area on a magneto-optical disc embodying the present invention.

FIG. 12A is a block diagram showing the connecting state between an audio transferring unit 10 and a recording unit 20 according to the present invention.

FIG. 12B is a timing chart for illustrating compressed audio data ATRAC sent from the audio transferring unit 10 to the recording unit 20, a request signal Data Req sent from the recording unit 20 to the audio transferring unit 10 and the processing timing on the recording unit.

FIG. 12C is a timing chart for illustrating a command signal Command sent from the audio transferring unit 10 to the recording unit 20, an acknowledgment signal ACK sent from the recording unit 20 to the audio transferring unit 10 and the processing timing on the recording unit.

FIG. 15A is a timing chart for compressed audio data ATRAC sent from the audio transferring unit 10 to the recording unit 20.

FIG. 15B is a timing chart of a request signal DATA Req sent from the recording unit 20 to the audio transferring unit 10.

FIG. 15C is a timing chart for illustrating a command signal Command sent from the audio transferring unit 10 to the recording unit 20.

FIG. 15D is a timing chart for illustrating an acknowledgment signal ACK sent from the recording unit 20 to the audio transferring unit 10.

FIG. 15E is a timing chart for illustrating the timing of processing on the recording unit.

FIG. 16A is a timing chart for illustrating a command signal Command sent from the audio transferring unit 10 to the recording unit 20.

FIG. 16B is a timing chart for illustrating an acknowledgment signal ACK sent from the recording unit 20 to the audio transferring unit 10.

FIG. 16C is a timing chart for illustrating the timing of processing on the recording unit.

FIG. 16D is a diagrammatic view showing the contents of the management information TOC formed on the optical disc D.

FIG. 17A is a timing chart for illustrating a command signal Command sent from the audio transferring unit 10 to the recording unit 20.

FIG. 17B is a timing chart for illustrating an acknowledgment signal ACK sent from the recording unit 20 to the audio transferring unit 10.

FIG. 17C is a timing chart for illustrating the timing of processing on the recording unit.

FIG. 17D is a diagrammatic view showing the contents of the management information TOC formed on the optical disc D.

FIG. 18A is a timing chart for illustrating a command signal Command sent from the audio transferring unit 10 to the recording unit 20.

FIG. 18B is a timing chart for illustrating an acknowledgment signal ACK sent from the recording unit 20 to the audio transferring unit 10.

FIG. 18C is a timing chart for illustrating the timing of processing on the recording unit.

FIG. 18D is a diagrammatic view showing the contents of the management information TOC formed on the optical disc D.

FIG. 19 illustrates the contents recorded on the optical disc D.

FIG. 21A is a timing chart of ATRAC data furnished from the audio transfer unit 10 to the recording unit 20.

FIG. 21B is a timing chart of a request signal Data Req transferred from the audio transfer unit 10 to the recording unit 20.

FIG. 21C is a timing chart of ATRAC data furnished to the reproducing unit 41.

FIG. 21D is a timing chart of audio signals expanded by the reproducing unit 41.

FIG. 21E is a timing chart of the request signal Data Req sent from the reproducing unit 41 to the audio transfer unit 10.

FIG. 23A is a timing chart for illustrating the range of compressed data sent from the audio transfer unit 10 to the reproducing unit 41.

FIG. 23B is a timing chart for expanding the compressed data sent from the audio transfer unit 10 to the reproducing unit 41.

FIG. 25A is a timing chart for illustrating the range of compressed data sent from the audio transfer unit 10 to the reproducing unit 41.

FIG. 25B is a timing chart for expanding the compressed data sent from the audio transfer unit 10 to the reproducing unit 41.

FIG. 26 is a table for illustrating plural monitoring ranges previously set for the respective musical numbers.

FIG. 29 is a table for illustrating a variety of the subsidiary information and plural monitoring ranges pre-set for respective musical numbers.

DESCRIPTION OF PREFERRED EMBODIMENTS

Figure 1:
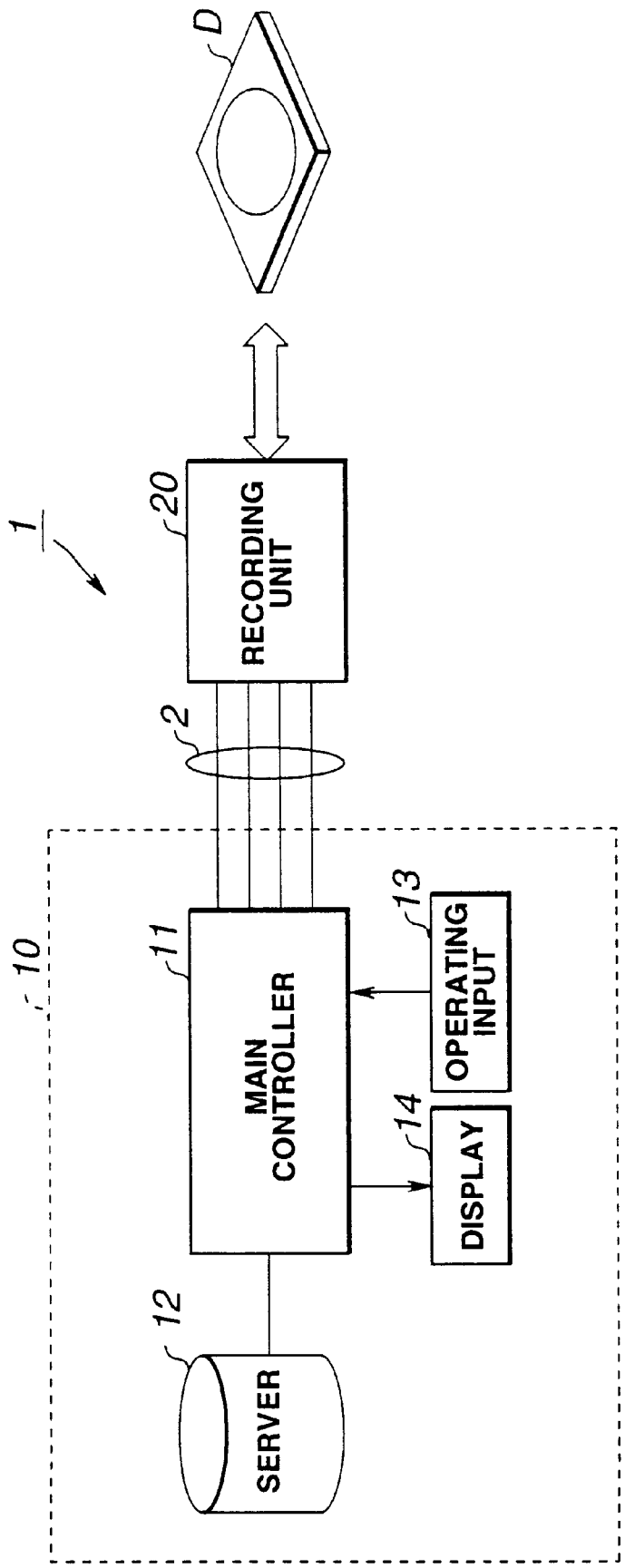
FIG. 1 is a block diagram of the overall dubbing system embodying the present invention.
Figure 2:
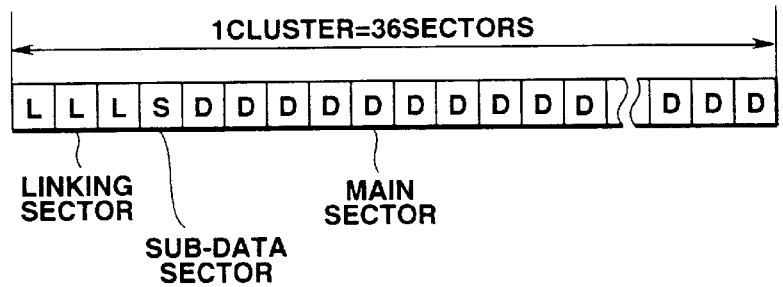
FIG. 2 shows the data structure on a magneto-optical disc embodying the present invention.

Referring to the drawings, preferred embodiments of an audio dubbing system according to the present invention will be explained in detail.

FIG. 1 shows an audio dubbing system embodying the present invention. An audio dubbing system 1 has an audio transfer unit 10 including a main controller 11, a server 12, an actuating input unit 13 and a display unit 14, a recording unit 20 for recording audio data on a portable recording medium and a connection cable 2 for interconnecting the audio transfer unit 10 and the recording unit 20.

In this audio dubbing system 1, audio data is previously stored in a server 12 of the audio transfer unit 10, so that the user will select desired audio data from the audio data stored in the server 12 for recording on a recording medium.

That is, the present audio dubbing system 1 is such a system purveying musical contents to the user by recording audio data on a recording medium owned by the user, instead of purveying contents of audio data stored in a medium such as compact disc or audio tape. For example, this audio dubbing system 1 can be installed on a railroad station or a retail store to furnish the chargeable musical contents to the user or on a music studio for contents management purposes.

The schematics of the contents purveying system of the present audio dubbing system 1 are hereinafter explained.

In the server 12 of the audio dubbing system 1, musical contents of musical numbers, each continuing for several minutes, such as top 100 numbers of the latest hit chart, are stored as audio data. The user confirms the contents purveyed by the audio dubbing system 1 by a display 14 and, if he or she finds desired contents, he or she selects one or plural contents using the actuating input unit 13. The user loads the recording medium D on the recording unit 20 and actuates the actuating input unit 13 to initiate the recording.

If the user initiates the recording operation, the main controller 11 of the audio transfer unit 10 furnishes audio data of the contents designated by the user from among the contents stored in the server 12 to the recording unit 20. The recording unit 20 records the audio data furnished from the audio transfer unit 10 in a recordable area of the recording medium.

When the recording of audio data of the contents desired by the user comes to a close, the audio dubbing system 1 terminates the purveying of the contents.

In the following description of the present audio dubbing system 1, it is assumed that the recording medium handled by the audio dubbing system 1 of the present embodiment is a magneto-optical disc which is a recordable and reproducible disc provided in the format termed a mini-disc (trademark).

This magneto-optical disc, termed the mini-disc, is a disc-shaped recording medium approximately 64 mm in diameter, held in a cartridge, and can record approximately 74 minutes of stereo audio data using an Adaptive Transform Acoustic Coding (ATRAC) system. This magneto-optical disc, termed the so-called mini-disc, is herein referred to simply as an optical disc D.

Since the audio dubbing system 1 records the audio data compressed in accordance with the ATRAC system on the optical disc D, audio data of the contents stored in the server 12 are previously compressed in accordance with the ATRAC system. The audio data, compressed in accordance with the ATRAC system, is directly recorded on the optical disc D, without processing the audio data with decoding or encoding. The audio data compressed by the ATRAC system is referred to herein as ATRAC data. Thus, a connection cable 2 used for transferring audio data from the audio transfer unit 10 to the recording unit 20 transfers the ATRAC data. It is noted that control commands or command data (Command) such as Table-Of-Contents (TOC) data of the optical disc D are sent over the connection cable 2 in accordance with the transmission protocol which will be explained subsequently.

The format of data of the optical disc D used in the audio dubbing system 1 will now be explained.

Data can be written on the optical disc D in units corresponding to an integer number times of a cluster. It is noted that an audio signal of approximately 2.04 second is produced on reproducing the ATRAC data recorded in each cluster.

It is noted that each cluster is made up of 3 linking sectors, 1 sub-data sector and 32 main sectors for recording audio data compressed in accordance with the ATRAC system. Each sector is a unit made up of 2352 byte data.

Since the format of the optical disc D uses an error correction system of the Advanced Cross Interleaving Reed Solomon Code (ACIRC) system, the linking sector is used as a sector allocated for completing the error-correcting interleaving within the cluster. That is, the linking sector is a waste sector for taking into account the interleaving in the error correction so that the data rewriting will be made on the cluster basis.

The sub-data sector (sub-data) is a reserve area.

The optical disc D handles 424 byte data compressed in accordance with the ATRAC system in units termed a sound group. This sound group allocates 212 byte data for each of the left and right channels. On expansion, the sound-group-based compressed data corresponds to 512 samples of left and right channels. These 512 samples of data correspond to 2048 byte data, more specifically, 512 samples×16 bits×2 channels÷8 bits=2048 bytes.

Figure 3:
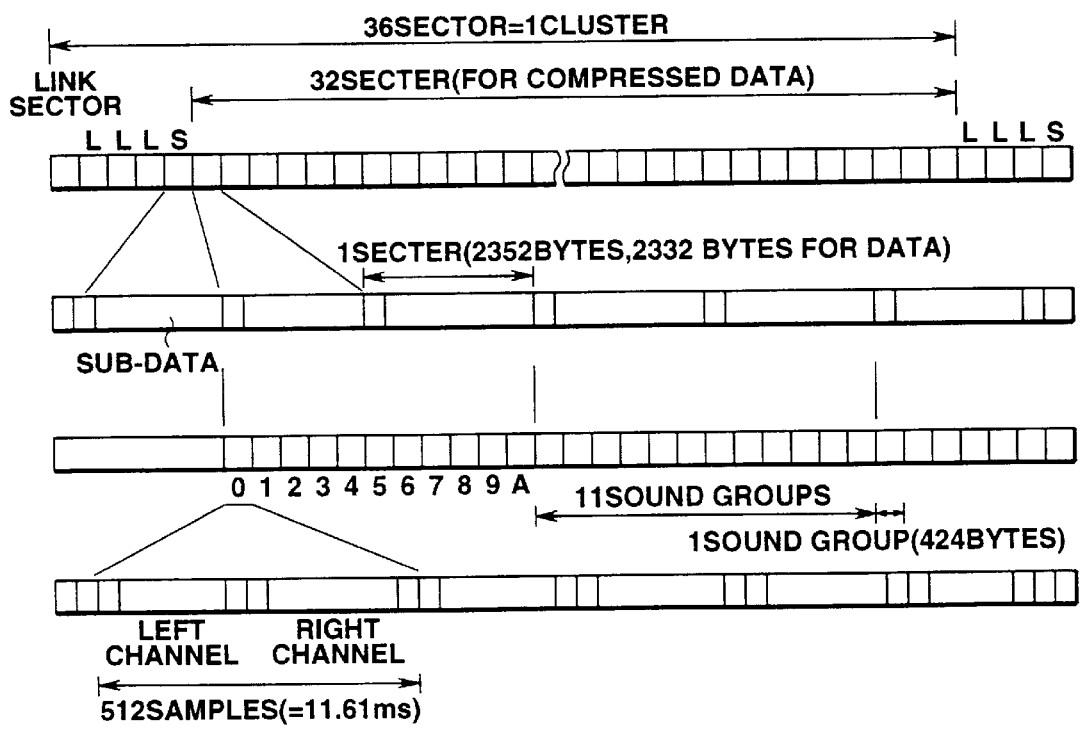
FIG. 3 similarly shows the data structure on a magneto-optical disc embodying the present invention.

11 of the sound groups make up two sectors, as shown in FIG. 3.

The recording area of the optical disc D is split into a program area for recording audio data compressed in accordance with the ATRAC system, a User Table-Of-Contents (U-TOC) area as a management area for recording management data for managing audio data recorded in the program area, and a Pre-mastered Table-Of-Contents (P-TOC) area, as a lead-in area.

In this optical disc D, musical numbers can be erased or edited by rewriting the U-TOC information instead of physically erasing the actual music data. For example, in the case of the optical disc D having recorded thereon five musical numbers, if a start address and an end address of a third musical number are specified as a recordable area, the third musical number cannot be reproduced. Thus, when recording the ATRAC data on the optical disc D, this U-TOC information needs to be re-written simultaneously. This U-TOC is explained hereinbelow. The unit of audio data recorded on the optical disc D is simply termed 'track'. This track is the unit of a musical number corresponding to the contents of the music purveyed by the audio dubbing system 1.

The U-TOC of the optical disc D is made up of from U-TOC sector 0 to U-TOC sector 15, totaling 16 sectors. The U-TOC sector n, where n denotes 1 to 15, is indicated simply as U-TOCn.

FIG. 4 shows data recorded on the U-TOC0. The data recorded on the U-TOC0 is partitioned into bytes and represented as a slot for convenience. Each slot is specified by numerical figures from 0 to 587 on the ordinate in FIG. 4 by the slot numbers of from 1 to 4 on the abscissa. The same applies for the U-TOC1 and so forth.

In the U-TOC0, there are recorded 12 byte header data followed by ClusterH and ClusterR specifying the address information of the TOC0. In the TOC0, there are recorded a Maker code, specifying the maker of the optical disc D, FirstTNO specifying the track number of the first track of the optical disc D and LastTNO specifying the rack number of the last track, beginning from a slot 7X1. In the U-TOC0, Used Sectors specifying the use state of the sectors and DiscSerialNo specifying the serial number of the optical disc D are recorded in slot 8X4 and in slot 10X4, respectively.

In the U-TOC0, there are also recorded DiscID specifying the ID number of the optical disc D, a pointer P-DFA (Pointer for Defective Area) specifying the slot having recorded therein the start address of an area for recording the defective address information produced on the optical disc D, a pointer P-EMPTY (Pointer for Empty Slot) specifying the use state of a slot and a pointer P-FRA (Pointer for free Area) specifying a slot having recorded therein the start address of an area used for managing the recordable area, beginning from a slot 11X1. In the U-TOC0, there its also recorded a pointer P-TNOn specifying the slot having recorded therein a start address of each track recorded on the optical disc D from a slot 12X2 to a slot 75X4, n specifying the track number of each track. Since 255 tracks can be provided on the optical disc D, n is an integer from 1 to 255.

In the U-TOC0, there are also recorded a start address and an end address of each track, link information Link-P and a track mode (Trackmode) from a slot 78X1 to a slot 587X4. In the U-TOC0, there are further recorded 255X4 slots for recording the start address and the end address. The start and end addresses are recorded in a slot associated with each track.

Therefore, the pointer recorded in each of the above-mentioned P-DFA, P-EMPTY and in P-FRA indicate a slot of a start address represented from the slot 78X1.

Figure 5:
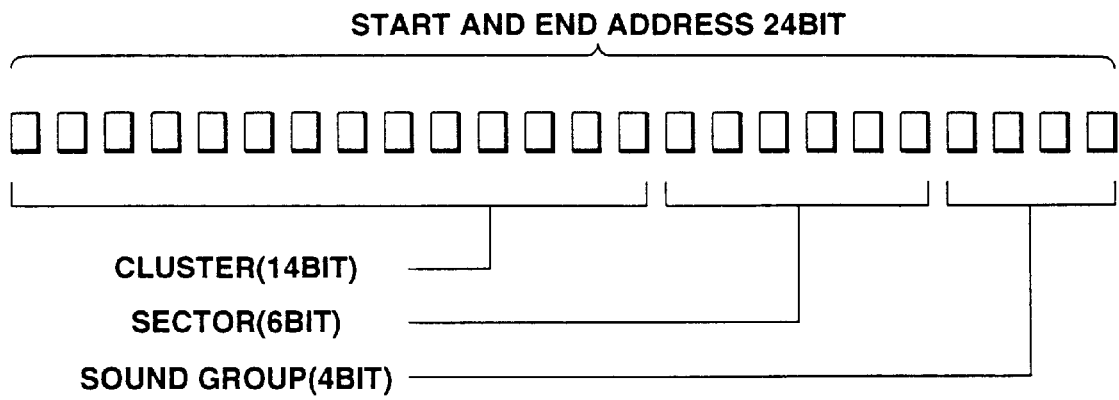
FIG. 5 shows the data structure of a slot on a U-TOC which is a management area on a magneto-optical disc embodying the present invention.

The above-mentioned start and end addresses are represented in 3 bytes=24 bits, as shown in FIG. 5. In the start and end addresses, a cluster address, a sector address and an address of the sound group are recorded in the first 14 bits, next 6 bits and the trailing 4 bits, respectively.

Figure 6:
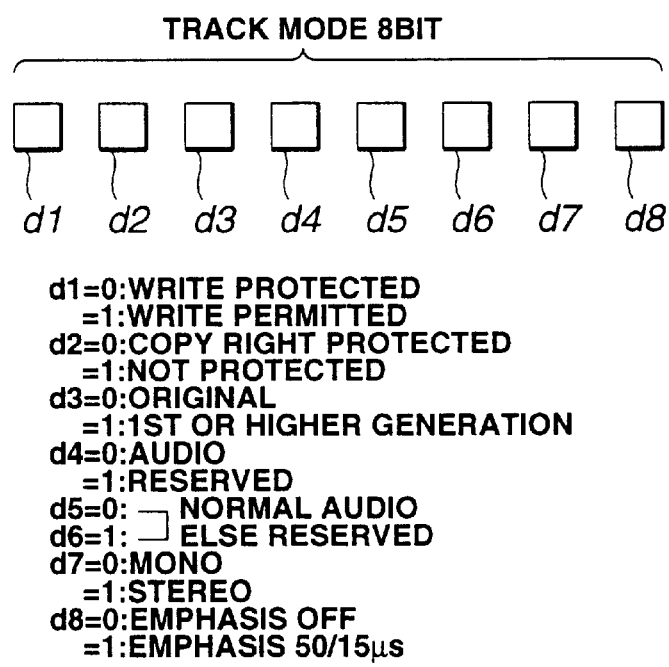
FIG. 6 shows the data structure of a track mode on a U-TOC which is a management area on a magneto-optical disc embodying the present invention.

The track mode (Trackmode) is represented by 1 byte=8 bit data, as shown in FIG. 6. In the track mode (Trackmode), the recording protect information, duplication protect information, generation information, audio information, erasure reserve information, monaural or stereo information and the emphasis information are recorded in the first bit, second bit, thirds bit, fourth bit, fifth and sixth bits, seventh bit and in the eighth bit, respectively. That is, the relevant information proper to each track is recorded in the track mode (Trackmode).

The link information P-Link is a pointer used for tracing from which start address the next data is recorded in case the same track is not recorded as a continuous data stream on the optical disc D, that is in case data of the same track is recorded discretely in the recording area of the optical disc. For example, if, in reproducing a track, data from the start address of the slot 586X1 needs to be reproduced next to the end address represented in the slot 78X1, the link information Link-P of the slot 80X4 specifies the slot 58X1.

That is, in the optical disc D, data need not necessarily be recorded on the recording medium, that is as a continuous data stream, but a sequential data string may be recorded discretely. If data is recorded discretely, data continuity is indicated by this link information p-Link, such that, by transiently storing read-out data in a memory during reproduction and by writing data in the memory at a quicker rate than the data read-out rate, continuous data can be reproduced without interruptions.

If data shorter than the recorded program is overwritten on the previously recorded data, efficient recording can be achieved by specifying the redundant area as a recordable area (P-FRA) without erasing the redundant area.

Figure 7:
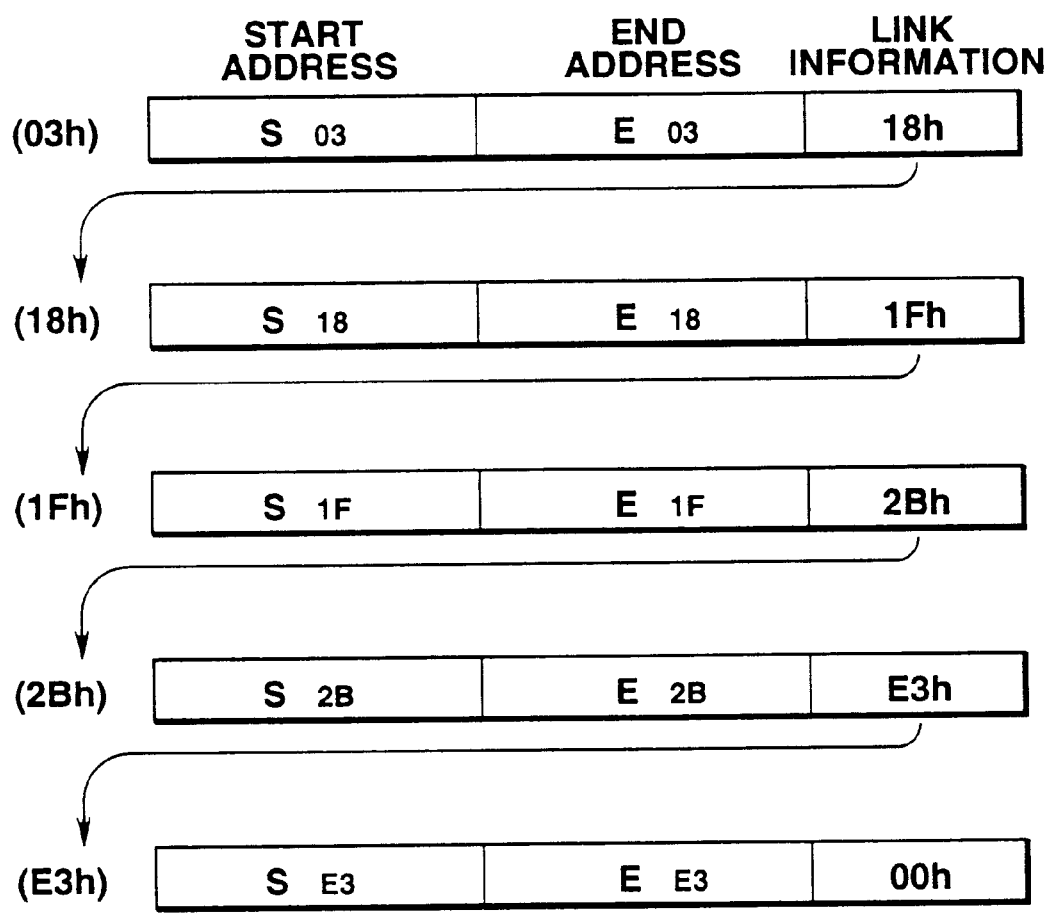
FIG. 7 is a diagrammatic view showing the linking state of each slot on a U-TOC which is a management area on a magneto-optical disc embodying the present invention.

The method for linking discrete areas is now explained with reference to FIG. 7 taking an example of the recordable area P-FRA.

If 03h (hexadecimal) is recorded in P-FRA specifying the leading end position of the slot managing the recordable area of U-TOC0, the slot associated with 03h is first accessed.

The start and end address recorded in the slot 03h specify a start point address and an end point address of a fractional portion in a track recorded on the disc.

The link information recorded in the slot 03h specifies the slot number of the next following slot and is herein 18h.

The area specified by the start point address and the end point address of the slot 18h specified by the link information of the slot 103h can be judged to be a recordable area. Further, by tracing the slot 1Fh stated in the link information of the slot 18h, the area specified by the start point address and the end point address of the slot 1Fh can be judged to be a recordable area.

Further, by tracing the slot 2Bh stated in the link information of the slot 1Fh, the area specified by the start point address and the end point address of the slot 1Fh can be judged to be a recordable area. By tracing slot addresses recorded in the link information as described above, slots are traced until the link information is equal to 00h.

By tracing the slots beginning from a slot specified by P-FRA until the link information is equal to Null (=00h), it is possible to link on the memory plural fractional parts making up a track discretely recorded on the disc.

Although P-FRA is taken as an example for explanation, discretely present fractional parts can similarly linked for P-DFA, P-EMPTY and T-TNO0 to 255.

FIG. 8 shows data recorded on the U-TOC1.

In the U-TOC1, the title of each track and title of the optical disc D in its entirety are managed.

If the recording track is audio data, the title of the optical disc D in its entirety and the title of each track correspond to the album title and the name of the performer and to the name of the musical number, respectively.

The letter information for each track is recorded in the slot specified by P-TNAn, n being 1 to 255, and, if there are a large number of letters, the link information is used to connect plural slots in order to effect recording.

FIG. 9 shows data recorded on the U-TOC2.

In the U-TOC2, the recording time and data for each program recorded in the program area are managed in the similar configuration to the above-mentioned U-TOC0.

FIG. 10 shows data recorded in the U-TOC4.

In U-TOC4, the title of each program recorded in the program area is managed in the similar configuration to the above-mentioned U-TOC0 so that the Japanese syllabic characters and kanji can be used as fonts of the title of the entire optical disc D.

Figure 11:
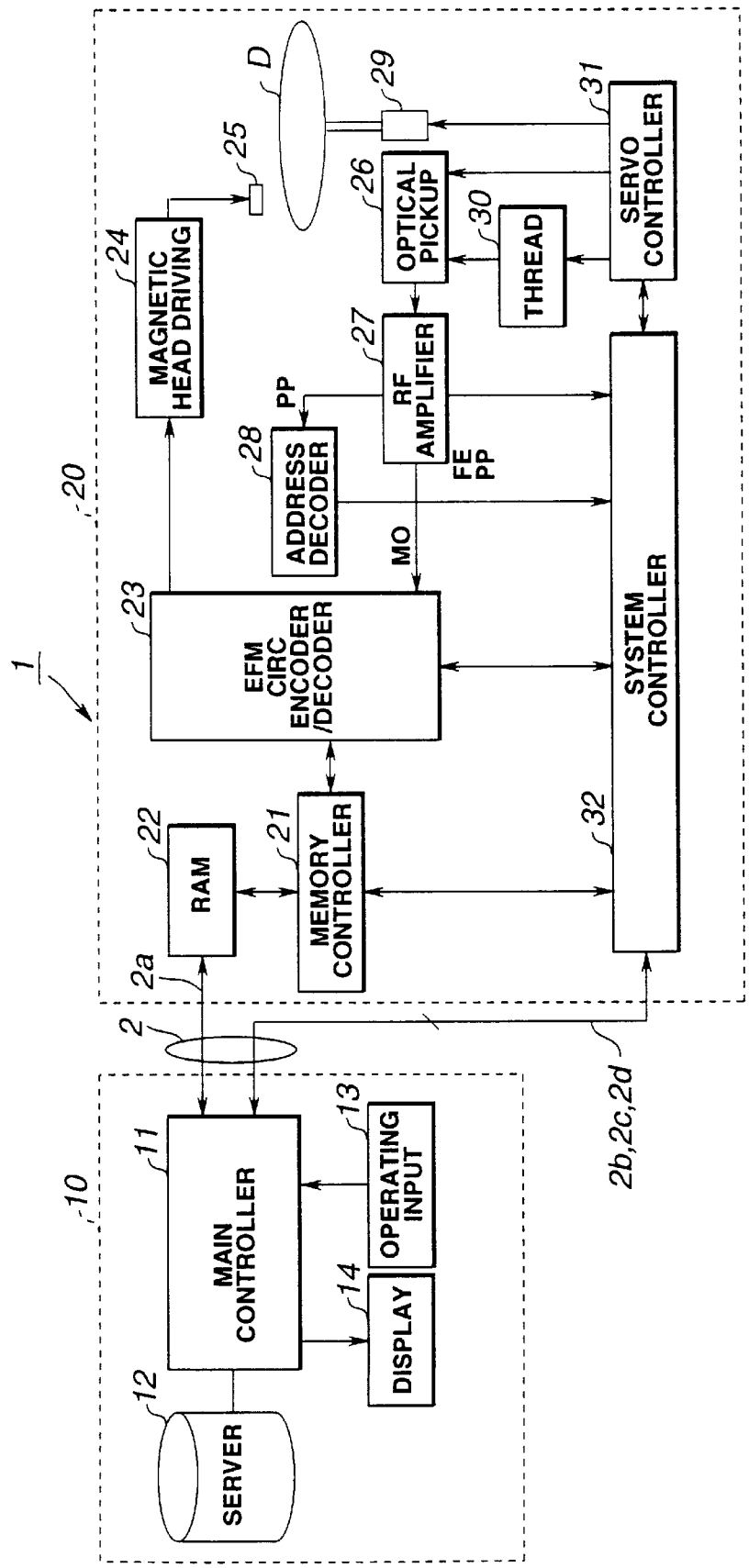
FIG. 11 is a detailed block diagram of a recording device shown in FIG. 1.

Referring to FIG. 11, the configuration of the audio dubbing system 1, added to that of the recording unit 20 as described above, will be explained in detail.

FIG. 11 shows the block diagram of the audio dubbing system 1 embodying the present invention. This audio dubbing system 1 is made up of an audio transfer unit 10, recording unit 20 and a connection cable 2 interconnecting the audio dubbing system 1 and the recording unit 20. The audio transfer unit 10 has a main controller 11, a server 12, actuating input unit 13 and a display unit 14. The recording unit 20 is used for recording audio data in a portable type recording medium.

The recording unit 20 includes a random-access memory (RAM) 22 for storing data sent from the audio transfer unit 10, and a memory controller 21 for controlling the RAM 22. The recording unit 20 also includes an encoding/decoding circuit 23 for decoding and encoding data and a magnetic head driving circuit 24 for driving a magnetic head 25 and an optical pickup 26 for illuminating the laser light on the optical disc D for detecting the reflected light. The recording unit 20 also includes a RF amplifier 27 for reproducing the focussing error signals FE, push-pull signals PP and photomagnetic playback signals MO from the reflected light detected from the optical pickup 26. The recording unit 20 also includes an address decoder 28 for reproducing signals corresponding to the wobbling of the groove formed in the guide groove of the optical disc D based on the push-pull signal PP from the RF amplifier 27 for decoding the ADIP, and a spindle motor 29 for rotationally driving the optical disc D. The recording unit 20 further includes a thread unit 30 for radially moving the optical pickup 26 along the radius of the optical disc D.

The recording unit 20 includes a servo circuit 31 for controlling the focussing servo, thread servo and spindle servo based on the focussing error signals (FE) and the push-pull signals (PP) and a system controller 32 for controlling the memory controller 21, encoding/decoding circuit 23 and the servo circuit 31.

The optical pickup 26 illuminates the laser light on the optical disc D from the laser diode via an objective lens. The optical pickup 26 also detects the reflected light from the optical disc D by a photodetector to send the detection current to the RF amplifier 27.

The RF amplifier 27 generates the focussing error signals (FE), push-pull signals (PP) and the photomagnetic playback signals (MO) based on the detection current from the photodetector. The RF amplifier 27 sends the generated focussing error signals (FE) to the servo circuit 30, while sending the push-pull signal (PP) to the address decoder 28 and the servo circuit 30 and sending the photomagnetic playback signals (MO) to the encoding/decoding circuit 23.

The servo circuit 31 drives the objective lens via a biaxial unit of the optical pickup 26, based on the furnished focussing error signals (FE) and the push-pull signals (PP), in order to perform tracking and focussing servo control of the light beam radiated to the optical disc D. The servo circuit 31 drives a thread unit 30 based on the push-pull signal (PP) to perform thread servo control for driving the optical pickup 26 radially of the optical disc D. The servo circuit 31 performs spindle servo control of driving the spindle motor 29 to cause the optical disc D to be rotated at a Constant Linear Velocity (CLV) based on the spindle error signals from an optical disc rotation detection circuit, not shown.

The address decoder 28 regenerates the address information from the wobbled signals corresponding to the groove wobbling formed in the guide groove of the optical disc D.

The encoding/decoding circuit 23 converts the photomagnetic playback signals (MO) from the RF amplifier 27 into bi-level signals and decodes the bi-level signals in accordance with the Eight-to-Fourteen Modulation (EFM) system while also decoding error correction in accordance with the Cross-Interleaved Reed-Solomon Coding (CIRC). The encoding/decoding circuit 23 appends error correction codes to the recording signals supplied from the memory controller 21 in accordance with the CIRC system and modulates the resulting signal in accordance with the EFM system to send the recording signal to the magnetic head driving circuit 24.

The magnetic head driving circuit 24 drives the magnetic head 25 based on recording signal from the encoding/decoding circuit 23 to apply a modulating magnetic field on the optical disc D by way of recording the recording signals.

The memory controller 21 controls the writing and read-out of the ATRAC data to be stored on the RAM 22. This memory controller 21 causes the ATRAC data supplied from the audio transfer unit 10 transiently in the RAM 22 to send the transiently stored data subsequently to the encoding/decoding circuit 23.

The system controller 32 performs control of the recording unit 20 in its entirety. For example, the system controller 32 controls the memory controller 21, encoding/decoding circuit 23 and the servo circuit 31. The system controller 32 also controls the circuit s adapted for exchanging control data with the audio transfer unit 10, as will be explained subsequently.

By the above structure, the recording unit 20 of the audio dubbing system records ATRAC data sent from the audio transfer unit 10 on the optical disc D.

The data exchanging method between the audio transfer unit 10 and the recording unit 20 of the audio dubbing system 1 will now be explained with reference to FIGS. 12A to 12C.

The audio dubbing system 1 has the connection cable 2 interconnecting the audio transfer unit 10 and the recording unit 20. The connection cable 2 is made up of an ATRAC line 2a for sending the ATRAC data as compressed audio data sent from the audio transfer unit 10 to the recording unit 20 and a Data Rec line 2b for sending the ATRAC data request signal (Data Req) sent from the recording unit 20 to the audio transfer unit 10.

The ATRAC data corresponding to the contents stored in the server 12 are sent over the ATRAC line 2a from the main controller 11 of the audio transfer unit 10 to the memory controller 21 of the recording unit 20. Also, an ATRAC data request signal (Data Req) specifying a request of the ATRAC data is sent from the system controller 32 of the recording unit 20 over the Data Req line 2b to the main controller 11 of the audio transfer unit 10. That is, since the ATRAC data is transferred in terms of a pre-set volume as a unit, the recording unit 20 sends this request signal (Data Req) to the audio transfer unit 10 to make a request for the next data if all of the ATRAC data already transferred and written into the RAM 22 have been written in their entirety on the optical disc D. If the ATRAC data read into the RAM 22 have not been recorded on the optical disc D, the request signal to the audio transfer unit 10 is set to a transfer stand-by state.

The time chart of FIG. 12B shows the relation between the ATRAC data and the request signal (Data req).

If the recording state of the recording unit 20 is regular, the recording unit 20 sends the request signal (Data req) at time t11 to the audio transfer unit 10. When fed with the request signal (Data req), the audio transfer unit 10 starts to supply the ATRAC data of a pre-set amount to the recording unit 20 at time t12. When fed with the ATRAC data, the recording unit 20 halts the supply of the request signal (Data req) at time t13.

Also, if the recording state of the recording unit 20 is not regular, no request signal (Data Req) is sent from the recording unit 20 to the audio transfer unit 10, as indicated at time t14 to t15, so that no ATRAC data is transferred from the audio transfer unit 10 to the recording unit 20. If the request signal (Data Req) is not sent from the recording unit 20 for a pre-set time on end, the audio transfer unit 10 discontinues the recording operation.

The time domain from time t15 until time t16 specifies the time duration during which the supply of the ATRAC data to the recording unit 20 is normal.

If the request signal (Data Req) is sent as indicated from time t16 until time t17, but the ATRAC data is not sent for a pre-set time from the audio transfer unit 10, the recording unit 20 sets the data writing standby state, for example, the recording paused state, in order to await the ATRAC data. If the ATRAC data is sent, the recording unit 20 initiates the writing operation as indicated as from time t17. If the writing standby state continues for a pre-set time on end, the audio dubbing system 1 judges that some trouble has occurred to discontinue the processing.

Thus, the audio dubbing system 1 can record ATRAC data reliably by the recording unit 20 issuing the ATRAC data request signal (Data Req) to the audio transfer unit 10.

The audio dubbing system 1 also has a command line COMMAND 2c for transferring the control command or other command data such as the TOC information supplied from the audio transfer unit 10 to the recording unit 20 and an ACK line 2d for transferring an acknowledgment signal (ACKNOWLEDGE) to the command data from the audio transfer unit 10 to the recording unit 20, as shown in FIG. 12A.

The TOC information generated by the main controller 11 of the audio transfer unit 10 or the command data such as data sizes of the ATRAC data of various contents are sent over the command line 2c to the system controller 32 of the recording unit 20. If the recording unit 20 has terminated the processing relevant to the command data, the acknowledgment signal (ACKNOWLEDGE) is sent over the ACK line 2d from the system controller 32 of the recording unit 20 to the main controller 11 of the audio transfer unit 10.

Specifically, the relation between the command data and the acknowledgment signal (ACKNOWLEDGE) is shown in the timing chart of FIG. 12C.

First, the audio transfer unit 10 sends pre-set command data at time t21 to the recording unit 20. When the supply of the command data comes to a close, the recording unit 20 performs processing relevant to the supplied command data at time t22. When the processing relevant to the supplied command data comes to a close, the recording unit 20 sends a reset command at time t24 to the recording unit 20. On reception of the reset command, the recording unit 20 terminates the supply of the acknowledgment signal (ACKNOWLEDGE) at time t24. If the command data has been supplied but the acknowledgment signal (ACKNOWLEDGE) is not supplied for a pre-set time from the recording unit 20, the audio transfer unit 10 deems that some trouble has occurred and accordingly interrupts the processing.

The following Table 1 shows command data supplied from the audio transfer unit 10 to the recording unit 20 over the COMMAND line 2.

TABLE 1

| command name | data of command (1 byte) | function |
| --- | --- | --- |
| SETUP | 1 | set recording unit 10 to recording pause state |
| START | 2 | start recording |
| STOP | 3 | terminate processing |
| TOC0info | 4 | TOC0 information (track size and track mode) |
| ACK-RESET | 8 | ACK reset |
| ALRIGHT | 0b | recording state confirmed |
| Title | 83 | title information |

The setup command (SETUP) is a command for setting the recording unit 20 in the recording standby state, that is the recording pause state. On reception of the setup command (SETUP), the recording unit 20 is in the recording pause state. Specifically, this setup command (SETUP) is given as "01" data of 1 byte.

The start command (START) is a command specifying the recording start of the ATRAC data. On reception of the start command (START), the recording unit 20 initiates recording of the ATRAC data on the optical disc D. Specifically, this start command (START) is given as "02" data of 1 byte.

The stop command (STOP) is a command specifying the end of processing of the recording unit 20 relevant to the commands. On reception of the stop command (STOP), the recording unit 20 halts recording initiated by the start command (START). Specifically, this stop command (STOP) is given as "03" data of 1 byte.

The TOC0 information command (TOC0inf) is a command specifying the information recorded in the U-TOC sector 0 of the optical disc D. On reception of the TOC0 information command (TOC0inf) and the information on the track size and track mode next to the command, the recording unit 20 finds the recorded start and end addresses of the ATRAC data from the track size to record the TOC data in the U-TOC.

That is, the TOC0 information is inherently generated by the recording unit 20 itself so as to be recorded on the optical disc D. However, if ATRAC data of plural contents are supplied from the audio transfer unit 10, these data are sent as a continuous data stream to the recording unit 20, so that junction points between the contents cannot be distinguished and hence the track information cannot be generated. Therefore, the audio transfer unit 10 sends the track mode and the track size, indicating the data size specifying the data stream length of data corresponding to the respective contents, as the TOC0 information command (TOC0info). Based on the TOC0 information command (TOC0info), the recording unit 20 generates the TOC0 information to be recorded on the optical disc D.

Specifically, the track number TOC0 information command (TOC0info) is given as 1-byte "04" data.

The command (TNO) is a command specifying the track number of the ATRAC data to be recorded. On reception of the track number command (TNO) and the track number next following the command, the recording unit 20 performs processing for the next following title command (Title) on the track number. Specifically, the track number command (TNO) is given as 1-byte "05" data.

The reset command (ACK-RESET) is a command for resetting the acknowledgment signal (ACKNOWLEDGE) supplied from the recording unit 20. When fed with the reset command (ACK-RESET), the recording unit 20 halts the supplying of the acknowledgment signal (ACKNOWLEDGE). Specifically, the reset command (ACK-RESET) is given as 1-byte "08" data.

The recording state confirming command (ALRIGHT) is a command for confirming the recording state of the recording unit 20. On reception of the recording state confirming command (ALRIGHT), the recording unit 20 sends the acknowledgment signal (ACKNOWLEDGE) to the audio transfer unit 10. Specifically, the recording state confirming command (ALRIGHT) is given as 1-byte "0b" data.

The title (Title) command is a command which furnishes the title information to be recorded in the TOC1 and TOC4 of the optical disc 4. Next to the title command (Title), the letter string information and character data are supplied. On reception of the letter string information and character data, the recording unit 20 records the title information for each track in TOC1 and TOC2 of the optical disc D. Specifically, the title command (Title) is give as as 1-byte "83" data.

The processing contents of the audio dubbing system 1 are explained with reference to a flowchart shown in FIG. 13.

Figure 13:
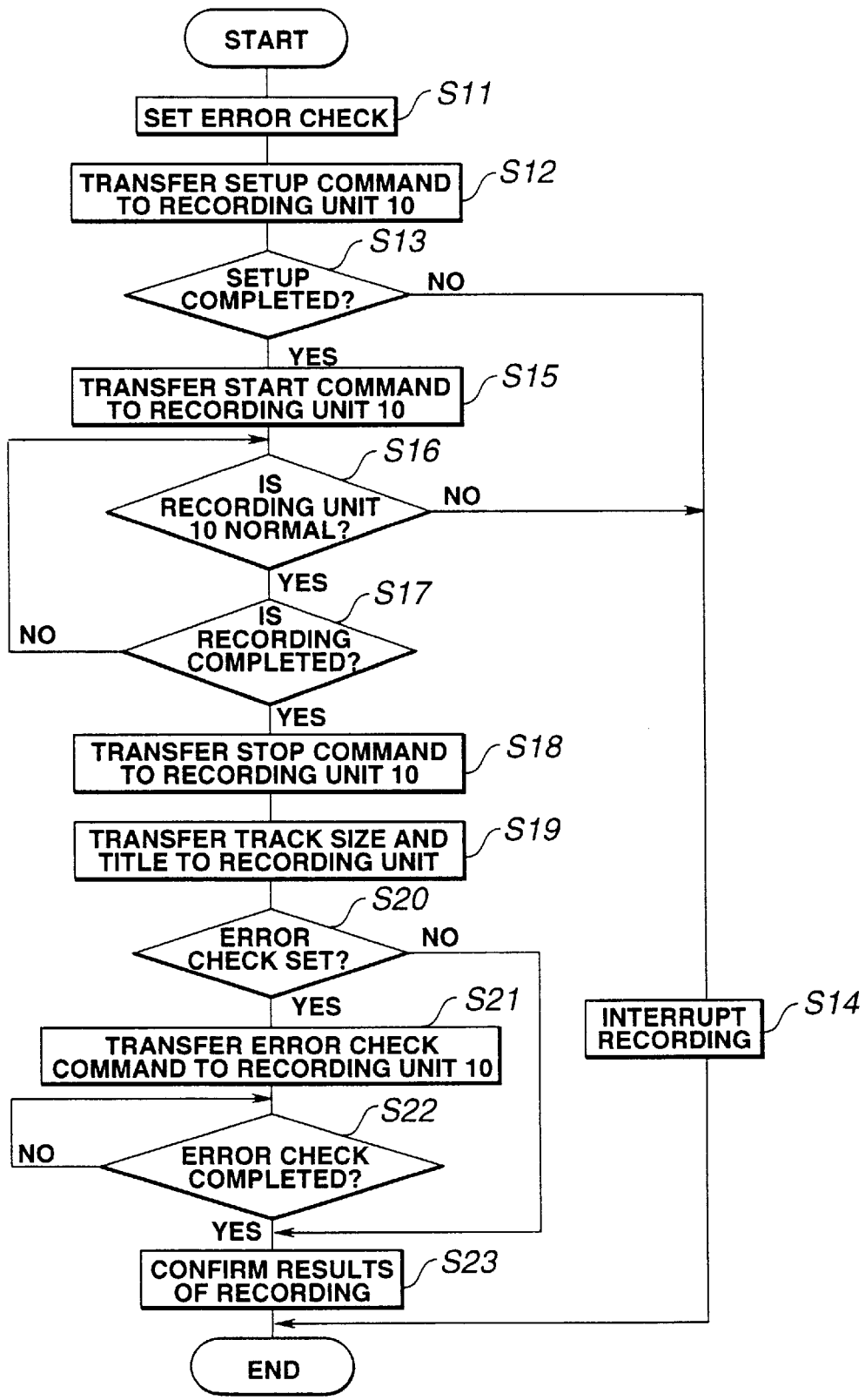
FIG. 13 is a flowchart for illustrating the dubbing processing by the recording unit 20 embodying the present invention.

When the user selects one or more contents to be recorded from the server 12 on the optical disc D and terminates the initial setting operations, such as loading of the optical disc D on the recording unit 20, the audio dubbing system 1 starts the processing as from step S11 shown in FIG. 13.

At step S11, the audio dubbing system 1 inquires the user whether or not an error check is to be performed by the display unit 14. If the user enters whether or not the error check is to be made using the actuating input unit 13, processing transfers to step S12. This error check will be explained in detail subsequently.

At step S12, the audio transfer unit 10 furnishes the setup command (SETUP) via a COMMAND line 2c to the recording unit 20. When the setup command (SETUP) is supplied from the audio transfer unit 10, the recording unit 20 sets the recording state on the optical disc D in the recording paused state and sends the acknowledgment signal (ACKNOWLEDGE) via ACK line 2d to the audio transfer unit 10. At step S13, the audio transfer unit 10 checks to see whether or not the acknowledgment signal (ACKNOWLEDGE) has been sent from the recording unit 20. If the acknowledgment signal (ACKNOWLEDGE) has been sent, processing transfers to step S15. If the acknowledgment signal (ACKNOWLEDGE) has not been sent for a pre-set time, processing transfers to step S14.

At step S14, the audio transfer unit 10 deems that recording on the optical disc D by the recording unit 20 is disabled by some trouble and displays an error message on the display 14 to terminate the processing.

At step S15, the audio transfer unit 10 sends the start command (START) over the COMMAND line 2c to the recording unit 20. On reception of the request signal (Data Req), the audio transfer unit 10 sends ATRAC data to the recording unit 20 every pre-set capacity. On reception of the ATRAC data, the recording unit 20 records data in the recordable area of the optical disc D.

Meanwhile, if plural tracks are designated by the user, that is if plural contents are designated, the audio transfer unit 10 sends the ATRAC data as a continuous data stream to the recording unit 20. The recording unit 20 also pre-stores the TOC information of the disc in the external memory or the like so that, if recording on the optical disc is not carried out regularly, the optical disc D can be restored to the pre-recording disc state.

If recording of the ATRAC data is started at step S15, processing transfers to step S16.

At step S16, the audio transfer unit 10, the audio transfer unit 10 sends the recording state confirming command ALRIGHT over the COMMAND line 2c to confirm the recording state of the recording unit 20. If the audio transfer unit 10 is fed from the recording unit 20 with the acknowledgment signal (ACKNOWLEDGE) and has confirmed that the recording state is normal, processing transfers to step S17 to confirm that the recording has come to a close. If the recording has not come to a close, processing reverts to step S16 to confirm whether or not recording has been performed regularly. That is, the processing of steps S16 and S17 confirms, at a pre-set interval, whether or not recording has been normal and whether or not recording has come to a close.

If it is deemed by the recording unit 20 that the recording has not been regular, processing transfers from step S17 to step S14 to interrupt the recording processing. At this time, the previous TOC information reserved in the external memory or the like is rewritten on the optical disc D for restoring the optical disc D to the pre-recording state.

If it is judged that the recording has come to a close, processing transfers from step S17 to step S18.

At step S18, the audio transfer unit 10 sends a stop command (STOP) over the COMMAND line 2c to the recording unit 20. On reception of the STOP command, the recording unit 20 terminates the recording of the ATRAC data. When the STOP command is fed at step S18, processing transfers to step S19.

At step S19, the audio transfer unit 10 furnishes the TOC0 information command (TOC0info), track size information, title command (Title), number of letters of the title and character data or the like necessary TOC information.

On reception of the TOC information, the recording unit 20 records data from the U-TOC0 to the U-TOC4 of the optical disc D, based on the furnished TOC information. Meanwhile, the start address and the end address of each track are generated on the basis of the track size information supplied next to the TOC0 information command (TOC0info). That is, since the ATRAC data is furnished as a sole data stream, this data stream is divided from track to track into data sizes to generate the TOC information.

After furnishing the necessary TOC information at step S19, processing transfers to step S20.

At step S20, the audio transfer unit 10 judges whether or not the user has set for performing an error check at the previous step S11. If the user set for performing an error check, processing transfers to step S21 and, if otherwise, processing transfers to step S23.

At step S21, the audio transfer unit 10 sends an error check command over the COMMAND line 2c to the recording unit 20. On reception of the error check command, the recording unit 20 reads out the recorded ATRAC data to inspect whether or not there is any error in the recorded data.

When the error check by the recording unit 20 is started, the audio transfer unit 10 is in stand-by state at step S22 until the error check comes to a close. On termination of the error check, processing transfers to step S23.

At step S23, the audio transfer unit 10 displays the results of the test on the display unit 14. If the result of the error check has revealed that there is any error caused in the recorded data, the pre-recording TOC information reserved in, for example, the external memory, is recorded on the optical disc D.

After displaying the test results at step S23, the audio dubbing system 1 terminates the processing.

By processing from step S11 to step S23, the audio dubbing system 1 can positively record the ATRAC data on the optical disc D.

In the above-described processing from step S11 to step S23, the necessary TOC information is sent to the recording unit 20 after recording all of the ATRAC data. However, the audio dubbing system 1 can also send the TOC information before the audio transfer unit 10 sends the ATRAC data to the recording unit 20.

That is, the processing of step S19 is performed after terminating the setup and before sending the start command (START), that is between the processing at step S13 and that at step S15. Since the TOC information is recorded by the recording unit 20 after recording the ATRAC data on the optical disc D, the TOC information previously furnished needs to be stored in, for example, the external memory. By previously holding the TOC information in, for example, the external memory before recording the ATRAC information, the name of the musical number to be recorded can be displayed on the display unit.

It is also possible with the audio dubbing system 1 to furnish the TOC information in parallel at the same time as the audio transfer unit 10 is furnishing the ATRAC data to the recording unit 20.

That is, since the ATRAC data and the commands are sent separately over the ATRAC line 2a and over the COMMAND line 2c, the processing of steps S16 and S17 and that of step S19 can be carried out in parallel thus shortening the data transfer time. It is similarly necessary in this case for the recording unit 20 to save the TOC information in, for example, the external memory, so that the TOC information will be recorded on the optical disc D after recording all of the ATRAC data.

In the above-described processing from step S11 to step S23, the ATRAC data corresponding to plural contents are handled as a sole data stream and the information required for generating the TOC information is sent separately from the audio transfer unit 10 to the recording unit 20. However, when plural contents are specified by the user, it is also possible for the audio dubbing system 1 to record ATRAC data corresponding to a sole contents on the optical disc D, generate and record the TOC of the subsequently recorded ATRAC data and to record the ATRAC data corresponding to the further following contents.

The above processing can be realized by the processing from step S15 to step S16 constituting a loop repeated from one contents to another.

Specifically, the recording of two musical numbers of the musical contents on the optical disc D is hereinafter explained by referring to a timing chart.

Figures 14A, 14B:
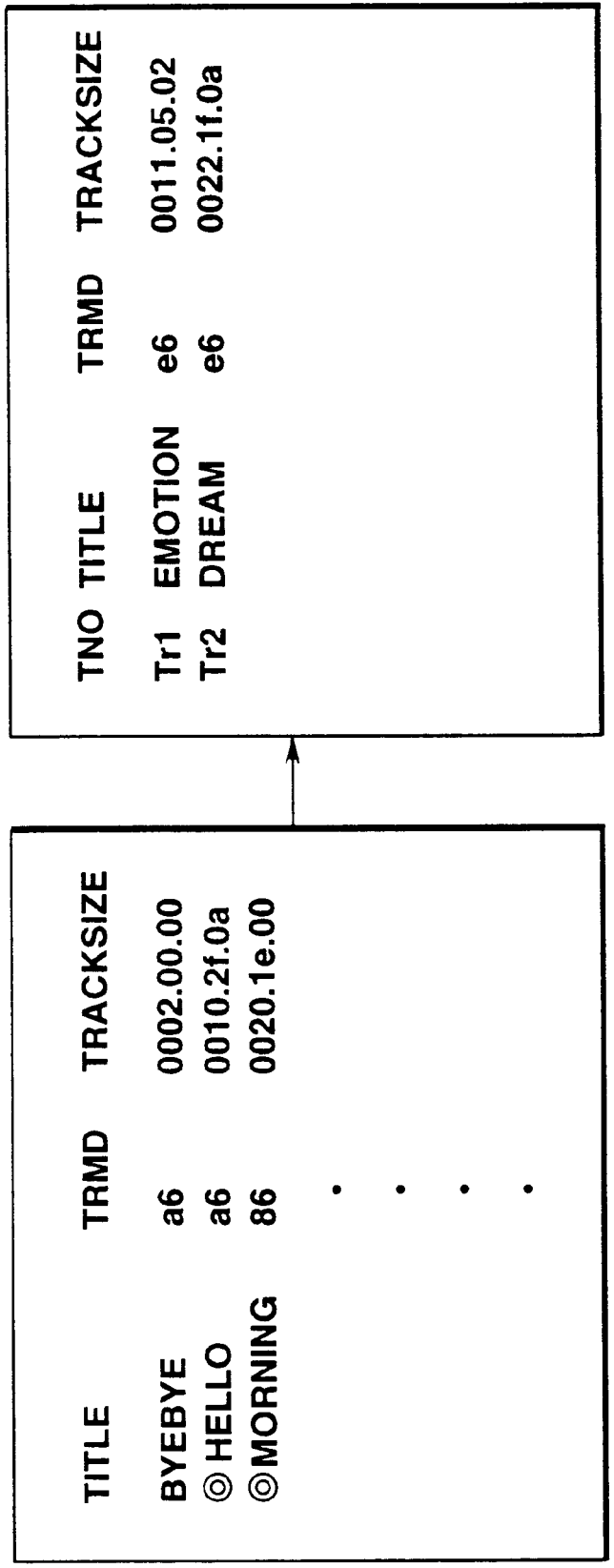
FIG. 14A shows the management information for the music program stored in a server embodying the present invention.
FIG. 14B shows the management information for the music program recorded on an optical disc D embodying the present invention.

Referring to FIG. 14A, there are stored in the server 12 first contents having a title "Bye-bye", a track mode (trmd) of "a6" and a track size of "000.2.00.00", second contents having a title "Hello", a track mode (trmd) of "a6" and a track size of "0010.2f.0a" and third contents having a title "Morning", a track mode (trmd) of "86" and a track size of "0020.1e.00".

On the optical disc D as a recording medium, there are recorded two musical numbers, namely a first track having the title "Emotion", a track mode (trmd) of "e6" and a track size "0011.05.02" and a second track having the title "Dream", a track mode (trmd) of "e6" and a track size "0022.1f.0a".

For recording the second contents (ATRAC data having the title "Dream") and the third contents (ATRAC data having the title "Morning"), indicated by ⊙ marks in FIG. 14A, stored in the server 12, the processing is carried out as shown in FIGS. 15A to 15E, 16A to 16D, 17A to 17D and 18A to 18D.

FIGS. 15A to 15E show a timing chart for command data between the audio transfer unit 10 and the recording unit 20 when transferring ATRAC data.

First, the recording unit 20 sends a setup command (SETUP) at time t31 to the recording unit 20. On reception of the setup command (SETUP), the recording unit 20 sets up a recording caused state and furnishes the acknowledgment signal (ACKNOWLEDGE) at time t32 to the audio transfer unit 10. On reception of the acknowledgment signal (ACKNOWLEDGE), the audio transfer unit 10 furnishes the reset command (ACK-RESET) to the recording unit 20 to reset the acknowledgment signal (ACKNOWLEDGE).

The audio transfer unit 10 furnishes at time t33 a start command (START) to the recording unit 20. This furnishing of the start command (START) corresponds to the above-mentioned processing at step S15. On reception of the start command (START), the recording unit 20 starts the recording operation, at the same time as it furnishes the acknowledgment signal (ACKNOWLEDGE) and the request signal (Data Req) to the audio transfer unit 10.

Based on the request signal (Data Req), the audio transfer unit 10 starts supplying at time t34 the ATRAC data of a pre-set capacity, that is the second contents (ATRAC data having a title "Hello" and the third contents (ATRAC data having the title "Morning"), to the recording unit 20. For furnishing ATRAC data every pre-set capacity, the audio transfer unit 10 sequentially furnishes the ATRAC data to the recording unit 20 based on the request signal (Data Req) supplied at time points t35, t36, t37 and t38 from the recording unit 20.

The audio transfer unit 10 furnishes the recording state confirming command (ALRIGHT) at a pre-set interval to check to see whether or not the recording state of the recording unit 20 is normal. This furnishing of the recording state confirming command (ALRIGHT) to see whether or not the recording state of the recording unit 20 is normal corresponds to the processing at the above-mentioned processing at step S16.

When the audio transfer unit 10 judges that all ATRAC data has been sent to the recording unit 20, it sends the stop command (STOP) at time t39 to the recording unit 20. The processing of furnishing the stop command (STOP) corresponds to the processing at step S18. If the stop command (STOP) is furnished and the furnished ATRAC data in its entirety is recorded on the optical disc D, the recording unit 20 terminates the recording at time t40 while furnishing the stop command (STOP) to the audio transfer unit 10.

FIGS. 16A to 16D show a timing chart of the TOC0 information command (TOC0info) sent at the above-mentioned step S20 from the audio transfer unit 10 to the recording unit 20. FIGS. 16A and 16b show a time chart of data sent from the audio transfer unit 10 to the recording unit 20 and a recording state of the U-TOC0 of the optical disc D at each time point.

It is assumed that the newly dubbed musical number is provisionally registered in the U-TOC as the third track next to the previously recorded first and second tracks.

At a time point t51 when no TOC0 information command (TOC0info) is supplied, there are recorded in the U-TOC0 of the optical disc D the start address, end address and the track mode of the previously recorded first and second tracks (tracks having the titles "Emotion" and "Dream") and the start and end addresses of the provisionally recorded third track.

The audio transfer unit 10 furnishes at time t52 the track mode and the track size of the first contents. That is, the audio transfer unit 10 furnishes, along with the TOC0 information command (TOC0info), the number of the contents of the ATRAC data having the title "Hello", the track mode of the contents and the track size of the contents.

On reception of the track mode and the track size of the first contents, the recording unit 20 generates the U-TOC0 information, based on the furnished information, to record the generated information on the optical disc D. Thus, at time t53, the track mode, start address and the end address associated with the first contents are recorded in TOC0 of the optical disc D.

The audio transfer unit 10 then sends at time t53 the track mode and the track size of the second contents. That is, the audio transfer unit 10 sends, along with the TOC0 information command (TOC0info), the contents number of the ATRAC data having the title "Morning", as well as the track mode and the track size of the contents.

On reception of the track mode and the track size of the second contents, the recording unit 20 generates the U-TOC0 information based on the furnished information to record the generated information on the optical disc D. Thus, at time t54, the track mode, start address and the end address associated with the second contents are recorded in the U-TOC0 of the optical disc D.

The audio transfer unit 10 sends at time t55 a stop command (STOP). On reception of the stop command (STOP), the recording unit 20 judges that the processing corresponding to the previously furnished TOC0 information command (TOC0info) has come to a close and proceeds to the processing of deleting the surplus based on the assumption that there is no data downstream of the end address corresponding to the second contents.

Thus, at time t56, there is recorded in the U-TOC0 of the optical disc D the track having the title "Hello" and the track having the title "Morning" in succession along with the previously recorded U-TOC0 data of the first and second tracks.

FIGS. 17A to 17D and 18A to 18D are time charts for the title information supplied at the above-mentioned step S20 from the audio transfer unit 10 to the recording unit 20. Meanwhile, FIGS. 17A and 18A show time charts of data furnished from the audio transfer unit 10 to the recording unit 20 and FIGS. 17B and 18B show the recording states of the U-TOC1 and 4 of the optical disc D at each time point.

Referring to FIG. 17D, there are recorded only the previously recorded titles of the first and second tracks in the U-TOC1 and U-TOC4 of the optical disc D at the time point t61 when the title command (Title) is not supplied.

The audio transfer unit 10 sends at time t62 the title of the first contents. That is, the audio transfer unit 10 sends the contents number of the ATRAC data number of letters supplied and letter data of the title "Hello" of the contents, along with the title command (Title).

On reception of the title of the first contents, the recording unit 20 generates the information of U-TOC1 and U-TOC4, based on the furnished information, to record the generated information on the optical disc D.

Meanwhile, if the number of letters of the title is larger than the prescribed value, processing is executed in plural installments. That is, if data for four letters only can be furnished, the four letters of "Hell" are first sent and the letter "o" is then sent at time t64.

Thus, at time t65, the title corresponding to the first contents is recorded on the U-TOC1 and U-TOC4 of the optical disc D.

The audio transfer unit 10 then furnishes the title of the second contents at time t66 in FIG. 18D. That is, the audio transfer unit 10 furnishes, along with the title command (Title), the contents number of the ATRAC data, the number of letters furnished and the letter data of the title "Morning" of the contents. On reception of the second contents, the recording unit 20 generates the information of U-TOC1 and U-TOC4, based on the furnished information, in order to record the generated information on the optical disc D.

Thus, at time t65, there is recorded on U-TOC1 of the optical disc D a title corresponding to the second contents.

When the recording unit 20 terminates the recording of all titles, the audio transfer unit 10 sends a stop command (Stop) at time t68 to terminate the processing.

By the above processing, the audio dubbing system 1 can record the TOC information on the optical disc D. That is, there can be recorded on the optical disc D the third track with the title "hello", the fourth track with the title "Morning" recorded from the server 12 and the ATRAC information along with the previously recorded first track with the title "Emotion" and second track with the title "Dream".

With the audio dubbing system 1, as described above, the audio transfer unit 10 transfers the track size of each track along with the ATRAC data and the recording unit 20 splits the data stream recorded on the optical disc D to record the start address and the end address of each track on U-TOC of the optical disc D. This allows the audio dubbing system 1 to record efficiently the track selected by the user on the optical disc D. The recording unit 20 records the ATRAC data as a track responsive to the transferred data stream, while recording the start and end addresses of each track on the optical disc D in the style of splitting the data stream of this one track for improving the utilization efficiency of the optical disc D.

Referring to the drawings, an audio dubbing system according to a second embodiment of the present invention, modified from the audio dubbing system 1 of the previous embodiment, will be explained. In the description of the audio dubbing system of the second embodiment, parts and components which are the same as those of the above-described audio dubbing system 40 are depicted by the same reference numerals and the detailed description is not made for clarity.

Figure 20:
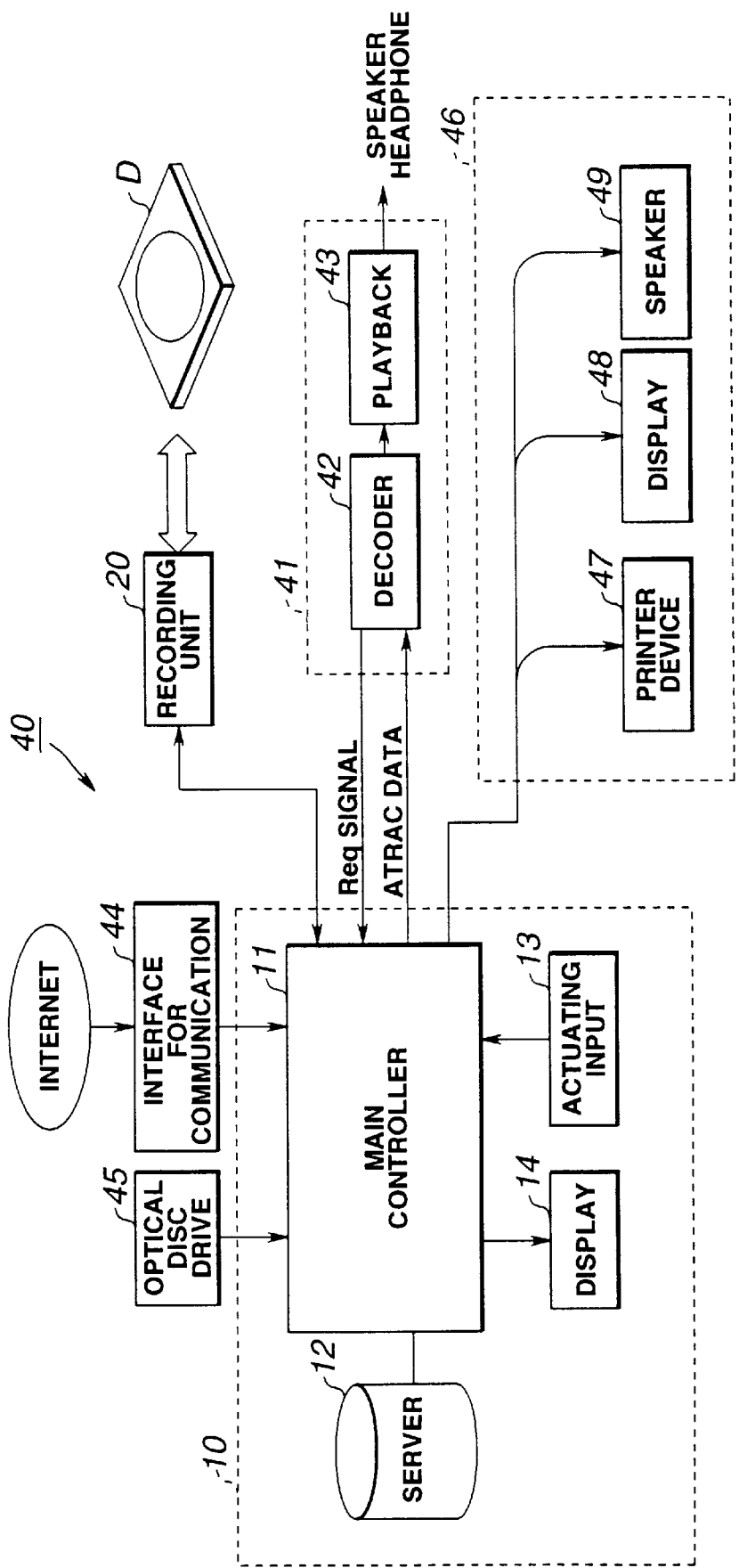
FIG. 20 is a block diagram showing a second embodiment of the present invention.

FIG. 20 is a block circuit diagram for illustrating the audio dubbing system 40.

The audio dubbing system 40 includes an audio transfer unit 10, a reproducing unit 41, an interface for communication 44, for connection to a network, such as Internet, an optical disc driving unit 45, and a pertinent information reproducing unit 46 made up of a printer device 47, a display 48 and a speaker 49.

Similarly to the previously explained audio dubbing system 1, the present audio dubbing system 40 previously stores audio data in the server 12 of the audio transfer unit 10, and selects audio data desired by the user from the audio data stored in the server 12 for recording on the recording medium.

In addition, the audio dubbing system 40 reproduces the audio data for recording from the reproducing unit 41 to output the reproduced data at the speaker or the headphone, while reproducing the pertinent data of the audio data for recording from the pertinent information reproducing unit 46.

The decoder 42 expands the ATRAC data supplied from the main controller 11 to generate audio data which is furnished from the decoder 42 to a playback processing circuit 43.

The playback processing circuit 43 converts digital signals into analog signals and amplifies the converted signals to generate analog audio signals. The analog audio signals generated by the playback processing circuit 43, are supplied to the speaker or to the headphone.

The communication interface 44 is, for example, modem or a terminal adapter for the ISDN (Integrated Services Digital Network). The main controller 11 can acquire the picture information, speech information or the text information via this communication interface 44 from the WWW (World-Wide Web) site of the Internet.

The optical disc drive device 45 is a device for reproducing an optical disc termed a video CD, CD-ROM or a DVD. The main controller 11 can acquire the picture information, speech information or the text information recorded on e.g., a CD-ROM by this optical disc drive device 45.

The printer device 47 of the pertinent information reproducing unit 46 prints out the picture information or the text information furnished from the main controller 11.

The display 48 of the pertinent information reproducing unit 46 displays the speech information or the text information furnished from the main controller 11. The display 48 may be used in common with the display unit 14 of the audio transfer unit 10.

The speaker 49 of the pertinent information reproducing unit 46 outputs the speech information furnished by the main controller 11. The speaker 49 may be used in common with the speaker or the headphone adapted for outputting audio signals outputted by the reproducing unit 41.

In the server 12 are stored ATRAC data of plural tracks as described above. There is also stored a list showing portions of the ATRAC data furnished to the recording unit 20 and to the reproducing unit 41 for outputting the playback sound during recording in association with respective tracks.

There are also stored in the server 12 the photo of the artist performing the track and the image picture of the track in association with the respective tracks. There are also stored the words of the track and text data showing the personal records of the artist. There are also stored in the server 12 the chapter number of the video CD or the address of the home pages if the photo or the moving picture of the artist are found on the video CD or in the home page of the Internet.

For recording the track selected by the user on the optical disc D, the main controller 11 reads out ATRAC data from the server 12 to route the read-out data to the recording unit 20. The transfer method used as this time is similar to that used in the previously explained audio dubbing system.

The main controller 11 also routes a pre-set portion of the ATRAC data of the track sent to the recording unit 20 to the reproducing unit 41. It is because the track needs to be able to be heard by the user during the time the recording unit 20 is recording the ATRAC data on the track. Since the ATRAC data is compressed to approximately ⅕, all data cannot be reproduced if it is tried to reproduce the track during recording. Thus, the main controller 11 slices a portion of the recorded ATRAC data to route the sliced data to the reproducing unit 41.

The ATRAC data supplied to the reproducing unit 41 is, for example, the sliced beginning portion, climax portion or end portion of the musical number. This sliced portion is previously set in the server 12. It is also possible to send the data of the track irrelevant to the ATRAC data being recorded to the reproducing unit 41. In this case, the ATRAC data supplied to the reproducing unit 41 may be a musical number of the artist being recorded different from the number being recorded.

The data transfer method between the audio transfer unit 10 and the reproducing unit 41 of the audio dubbing system 40 is explained.

FIGS. 21A to 21E illustrate the case of furnishing to the reproducing unit 41 the leading portion of the track of the ATRAC data sent from the audio transfer unit 10 to the recording unit 20.

As explained in connection with the audio dubbing system 1, the audio transfer unit 10 furnishes the ATRAC data of a pre-set capacity to the recording unit 20 based on the request signal (Data Req) from the recording unit 20. Thus, when sending to the recording unit 20 the ATRAC data divided into blocks 1 to 16, the audio transfer unit 10 sends the ATRAC data as shown in FIGS. 21A and 21B.

Also, the audio transfer unit 10 sends to the reproducing unit 41 the ATRAC data in terms of a pre-set capacity as a unit based on the request signal (Data Req) from the reproducing unit 41. At this time, the reproducing unit 41 decodes and reproduces the ATRAC data and, after outputting the audio signal, sends the next request signal (Data Req) to the audio transfer unit 10. Thus, the interval of sending the request signal (Data Req) of the reproducing unit 41 is varied with the compression ratio, such that, if the compression ratio is of the order of ⅕, the request signal sending interval is approximately four times as long as the interval of sending of the request signal (Data Req) of the recording unit 20.

Based on the request signal (Data Req) of the reproducing unit 41, the audio transfer unit 10 sequentially furnishes the leading portion of the ATRAC data sent to the recording unit 20, for example, the ATRAC data of the first to fourth blocks, as shown in FIG. 21C. It is also possible at this time to store the ATRAC data sent to the reproducing unit 41 previously in a external memory to send the stored data to the reproducing unit 41 responsive to the request signal (Data Req) of the reproducing unit 41.

Figure 22B:
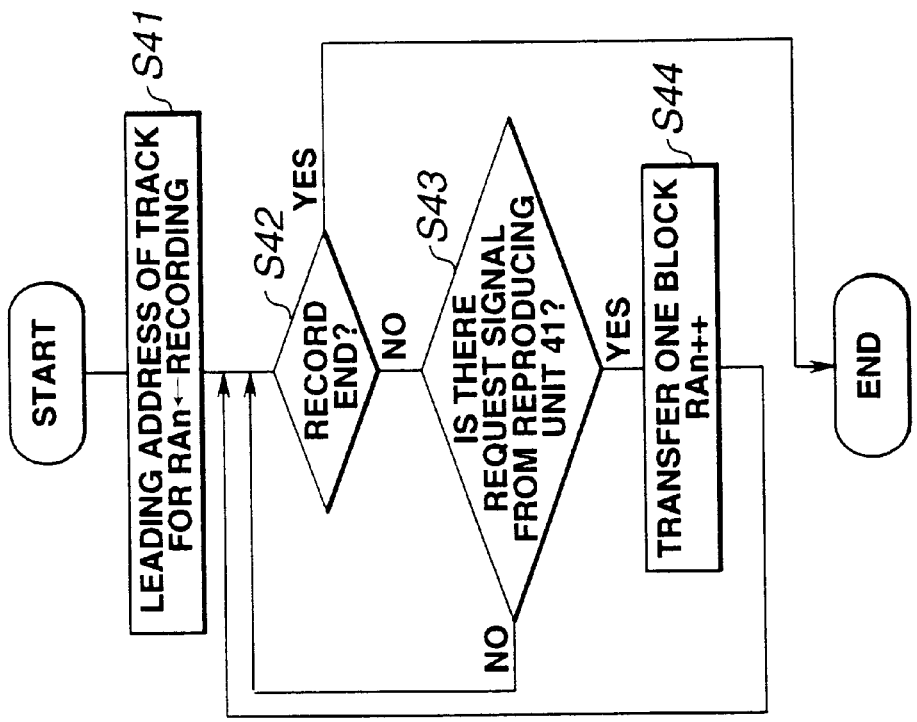
FIG. 22B is a flowchart showing the transfer processing of compressed data from the audio transfer unit 10 to the reproducing unit 41.
Figure 22A:
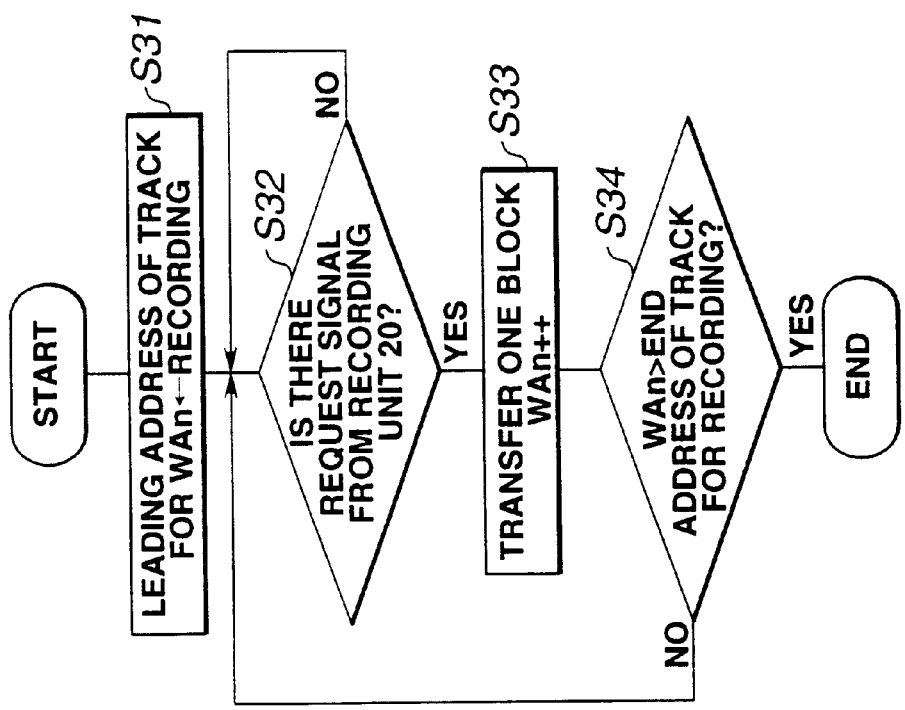
FIG. 22A is a flowchart showing transfer processing of compressed data from the audio transfer unit 10 to the recording unit 20.

FIGS. 22A and 22B are flowcharts for illustrating the control contents of the audio transfer unit 10 when the leading portion of a track of the ATRAC data sent from the audio transfer unit 10 to the recording unit 20 is being sent to the reproducing unit 41. Specifically, FIGS. 22A and 22B show the contents of transfer processing of the ATRAC data to the recording unit 20 and the contents of transfer processing of the ATRAC data to the reproducing unit 41.

When the recording processing is initiated, the audio transfer unit 10 performs processing indicated by steps S31 to S34 in FIG. 22A.

At step S31, the audio transfer unit 10 sets the compressed recording address WAn, as an address of the block of the ATRAC data furnished to the recording unit 20, at the leading end address of the track for recording, that is the user-selected track. After setting the compressed recording address WAn, the audio transfer unit 10 proceeds to step S32.

At step S32, the audio transfer unit 10 judges whether or not there is any request signal (Data Req) from the recording unit 20, and awaits at this step S32 until there is the request signal (Data Req). If this request signal (Data Req) is issued, the audio transfer unit 10 proceeds to step S33.

At step S33, the audio transfer unit 10 transfers the ATRAC data of the block of the compressed recording address WAn to the recording unit 20. Then the audio transfer unit 10 increments the compressed recording address WAn by 1 to proceed to step S34.

At step S34, the audio transfer unit 10 judges whether or not the compressed recording address WAn is larger than the end address of the track for recording. That is, the audio transfer unit 10 transfers all blocks to the recording unit 20 to judge whether or not the recording processing has come to a close. If the audio transfer unit 10 finds the compressed recording address WAn to be not larger than the end address of the track for recording, the audio transfer unit 10 repeats the processing as from step S32. If the audio transfer unit 10 finds the compressed recording address WAn to be larger than the end address of the track for recording, the recording processing is terminated. This indicates that the data volume of the track for recording in this case is larger than the recordable capacity on the disc.

For reproducing the ATRAC data, the audio transfer unit 10 performs the processing of steps S41 to S44 shown in FIG. 22B.

When the recording processing is initiated, the audio transfer unit 10 sets at step S41 a compressed reproducing address RAn, as an address of a block of the ATRAC data sent to the reproducing unit 41, in a leading address of the track for recording, that is the user-selected data. After setting the compressed reproducing address RAn, the audio transfer unit 10 proceeds to step S42.

At step S42, the audio transfer unit 10 judges whether or not the recording has come to a close. That is, the audio transfer unit 10 judges whether or not the processing of steps S31 to S34 has come to a close. If the recording is found to have come to a close, the reproducing processing is terminated. If otherwise, the audio transfer unit 10 proceeds to step S43.

At step S43, the audio transfer unit 10 judges whether or not there is the request signal (Data Req) from the reproducing unit 41. If there is no request signal (Data Req), the audio transfer unit 10 reverts to step S42 to await at steps S42 and S43 until the recording is terminated or until the request signal (Data Req) is issued. If there is the request signal (Data Req), the audio transfer unit 10 proceeds to step S44.

At step S44, the audio transfer unit 10 transfers the ATRAC data of the block of the compressed reproducing address RAn to the reproducing unit 41. The audio transfer unit 10 increments the compressed reproducing address RAn by 1 to repeat the processing as from step S42.

Thus, with the above-described audio dubbing system 40, the reproducing unit 41 expands and reproduces the compressed ATRAC data recorded by the recording unit 20 during the time the recording unit 20 is recording the ATRAC data for confirming the recording data during recording.

FIGS. 23A and 23B illustrate the ATRAC data furnished from the audio transfer unit 10 to the reproducing unit 41 when the recording unit 20 records ATRAC data of plural tracks on the optical disc D.

Similarly to the audio dubbing system 1, the audio dubbing system 40 furnishes the ATRAC data of plural tracks as a sole continuous stream. For example, when recording three tracks on the optical disc D, the audio transfer unit 10 furnishes the tracks 1 to 3 continuously to the recording unit 20, as shown in FIG. 23A. Also, the audio transfer unit 10 furnishes to the reproducing unit 41 the ATRAC data of the leading end of the track 1 during transfer of the track 1, as shown in FIG. 23B. When next the transfer of the track 2 is initiated, the ATRAC data in the leading end of the track 2 is furnished to the reproducing unit 41. When next the transfer of the track 3 is initiated, the ATRAC data in the leading end of the track 3 is furnished to the reproducing unit 41 until the end of transfer of the track 3. It should be noted that the capacity of the ATRAC data supplied from the audio transfer unit 10 for monitoring in the reproducing unit 41 is equivalent to the recording time of the track being recorded.

Figure 24B:
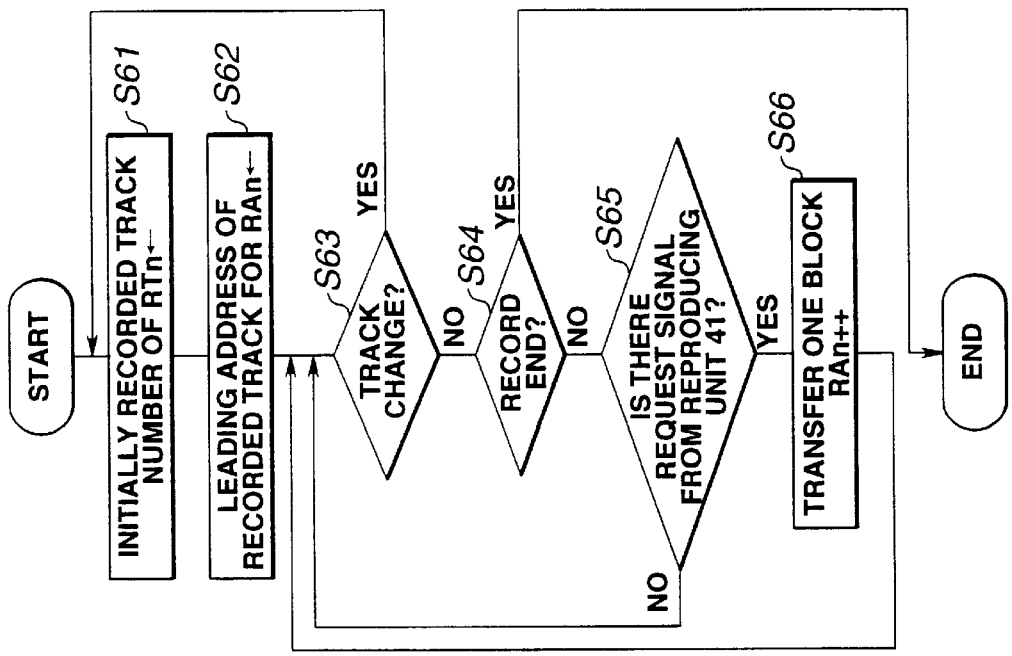
FIG. 24B is a flowchart for illustrating the transfer processing of compressed data from the audio transfer unit 10 to the reproducing unit 41.
Figure 24A:
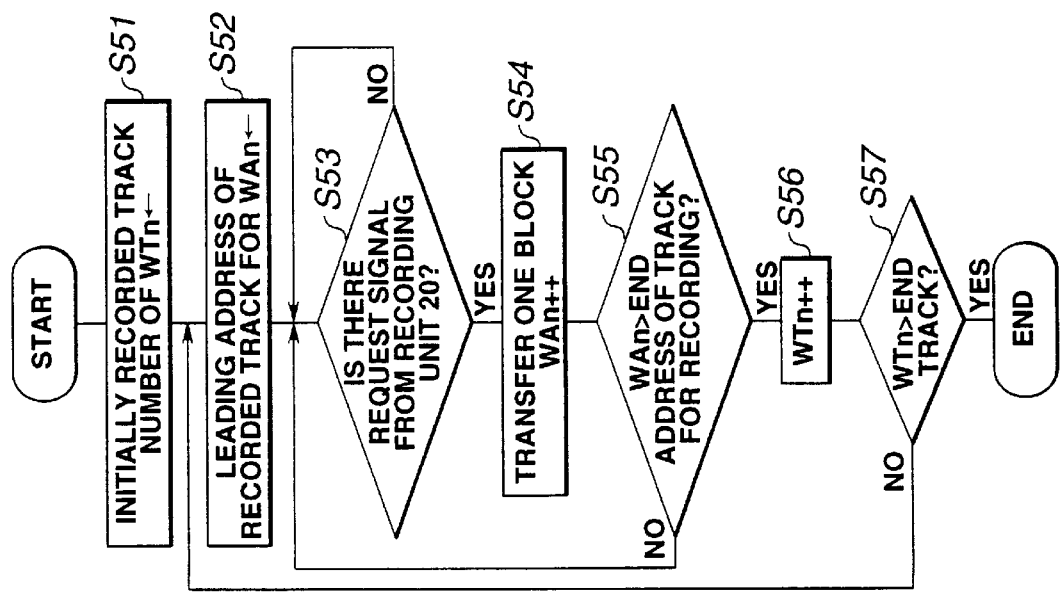
FIG. 24A is a flowchart for illustrating the transfer processing of compressed data from the audio transfer unit 10 to the recording unit 20.

FIGS. 24A and 24B are flowcharts for illustrating the control contents of the audio transfer unit 10 when recording the ATRAC data of plural tracks on the optical disc D from the audio transfer unit 10. FIGS. 24A and 24B show the transfer processing contents of the ATRAC data to the recording unit 20 and those of the ATRAC data to the reproducing unit 41, respectively.

On initiation of the recording processing, the audio transfer unit 10 performs processing shown in steps S51 to S57 shown in FIG. 24A.

At step S51, the audio transfer unit 10 sets the recording track number WTn, as a track number of a track furnished to the recording unit 20, in a track initially set by the user. On setting the recording track number WTn, the audio transfer unit 10 proceeds to step S52.

At step S52, the audio transfer unit 10 sets the compressed recording address WAn in the leading address of the track for recording, that is the user-selected track. After setting the compressed recording address WAn, the audio transfer unit 10 proceeds to step S53.

At step S53, the audio transfer unit 10 judges whether or not there is a request signal (Data Req) from the recording unit 20, and awaits at step S53 until there is the request signal (Data Req). When the request signal (Data Req) is issued, the audio transfer unit 10 proceeds to step S54.

At step S54, the audio transfer unit 10 transfers the ATRAC data of the block of the compressed recording address WAn to the recording unit 20. Then the audio transfer unit 10 increments the compressed recording address WAn by 1 to proceed to step S55.

At step S55, the audio transfer unit 10 judges whether or not the compressed recording address WAn is larger than the end address of the track for recording. That is, the audio transfer unit 10 judges whether or not all blocks of the track for recording are transferred to the recording unit 20 so that the recording processing comes to a close. If the compressed recording address WAn is found to be not larger than the end address of the track for recording, the audio transfer unit 10 repeats the processing as from step S53. If the compressed recording address WAn is found to be larger than the end address of the track for recording, the audio transfer unit 10 proceeds to step S56.

At step S56, the audio transfer unit 10 increments the recording track number WTn by 1 to proceed to step S57.

At step S57, the audio transfer unit 10 judges whether not the recording track number WTn is larger than the end track.

That is, the audio transfer unit 10 judges whether or not the recording processing for the track for recording in its entirety has come to a close. If the recording track number WTn is judged to be not larger than the end track, the audio transfer unit 10 repeats the processing as from step S51. If the recording track number WTn is judged to be larger than the end track, the audio transfer unit 10 terminates the processing.

On the other hand, for reproducing the ATRAC data, the audio transfer unit 10 performs the processing of steps S61 to S66 shown in FIG. 24B.

When the recording processing is initiated, the audio transfer unit 10 sets at step S61 the reproducing track number RTn, as a track number furnished to the reproducing unit 41, in the track for recording, that is the user-selected track. On setting the reproducing track number RTn, the audio transfer unit 10 proceeds to step S62.

At step S62, the audio transfer unit 10 sets the compressed reproducing address RAn in the leading address of the track for recording, that is the track set at step S61. On setting the compressed reproducing address RAn, the audio transfer unit 10 proceeds to step S62.

At step S63, the audio transfer unit 10 judges whether or not the track for recording has been changed. That is, the audio transfer unit 10 judges whether or not the processing of step S56 has been updated. If the track is judged to have been changed, the processing as from step S61 is repeated and, if otherwise, the audio transfer unit 10 proceeds to step S64.

At step S64, the audio transfer unit 10 judges whether or not recording has come to a close. That is, the audio transfer unit 10 judges whether or not the processing of steps S51 to S57 has come to a close. If the recording is judged to have come to a close, the reproducing processing is terminated. If otherwise, the audio transfer unit 10 proceeds to step S65.

At step S65, the audio transfer unit 10 judges whether or not there is the request signal (Data Req) from the reproducing unit 41. If there is no request signal (Data Req), the audio transfer unit 10 reverts to step S63. The audio transfer unit 10 awaits at steps S63, S64 and S65 until the track is changed, recording comes to a close and until there is issued the request signal (Data Req), respectively. If the request signal (Data Req) is issued, the audio transfer unit 10 proceeds to step S66.

At step S66, the audio transfer unit 10 transfers the ATRAC data of the block of the compressed reproducing address RAn to the reproducing unit 41. The audio transfer unit 10 increments the compressed reproducing address RAn by 1 to repeat the processing as from step S63.

With the audio transfer unit 10, as described above, the compressed ATRAC data recorded by the recording unit 20 is expanded and reproduced by the reproducing unit 41. If plural tracks are recorded, it is possible to confirm the audio data of the track under consideration.

In the audio dubbing system 40, since the audio transfer unit 10 performs the transfer of the ATRAC data to the recording unit 20 and transfer of the ATRAC data to the reproducing unit 41, independently of each other, the track 1 can be skipped in reproduction on actuation of the actuating input unit 13 if the user has desired to reproduce the track 2 in the course of reproduction of the track 1. Specifically, the audio dubbing system 40 skips a pre-set track by updating the processing at step S63 based on the actuating input by the user.

Thus, when recording the ATRAC data of plural tracks on the optical disc D in the audio dubbing system 40, the track(s) of the tracks for recording as desired by the user can be reproduced.

FIGS. 25A and 25B illustrate how an optional portion of a track of the ATRAC data sent from the audio transfer unit 10 to the recording unit 20 is sent to the reproducing unit 41.

If a contents purveyor purveying contents using the audio dubbing system 40 previously sets plural portions for the optical disc D to be monitored during dubbing, the user can easily comprehend the contents of the musical number. For example, the user can easily comprehend contents of the musical number if the leading portion, climax or digest portion and the end portion of the musical number are comprehended. For these three portions, for example, addresses are set for the ATRAC data furnished to the recording unit 20, as shown in FIG. 25A. It suffices if the audio transfer unit 10 furnishes the ATRAC data of the address-set portions to the reproducing unit 41 and if the reproducing unit 41 reproduces the furnished ATRAC data as shown in FIG. 25B.

The server 12 stores the number of unit s reproduced in each track in association with the tracks stored therein and the addresses of these units in an address table, as shown in FIG. 26. The main controller 11 of the audio transfer unit 10 refers to this address table to furnish the ATRAC data to the reproducing unit 41.

Specifically, when recording the track 1 on the optical disc D, the audio transfer unit 10 first refers to the address table shown in FIG. 26 to enter the ATRAC data from the address "0000" representing the leading end portion of the musical number up to the address "0030" in the reproducing unit 41. The audio transfer unit 10 then enters the ATRAC data as from the address "0200" up to the address "0240" representing the digest portion and finally furnishes the ATRAC data as from the address "0370" to the address "0400" representing the end portion of the musical number to the reproducing unit 41. The reproducing unit 41 can outputs audio signals of plural discrete domains in the musical number as shown in FIG. 25B.

Figure 27:
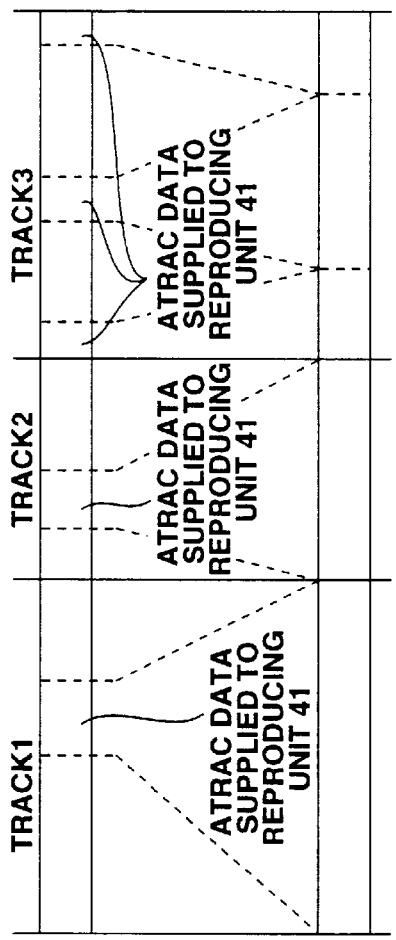
FIG. 27A is a timing chart for illustrating the range of the compressed data sent from the audio transfer unit 10 to the reproducing unit 41 and which is designated by the user.
FIG. 27B is a timing chart for illustrating the expansion of compressed data transferred from the audio transfer unit 10 to the reproducing unit 41.

In FIGS. 27A and 27B, the recording unit 20 records ATRAC data of plural tracks on the optical disc D. Specifically, of the ATRAC data furnished from the audio transfer unit 10 to the recording unit 20, an optional portion of a track is furnished from the audio transfer unit 10 to the reproducing unit 41.

In such case, the audio transfer unit 10 refers to the address table shown in FIG. 23A to acquire the address as set on the associated track. The audio transfer unit 10 furnishes the ATRAC data of the acquired address portion to the reproducing unit 41, as shown in FIG. 27A. The reproducing unit 41 then reproduces the furnished ATRAC data, as shown in FIG. 27B.

Figure 28:
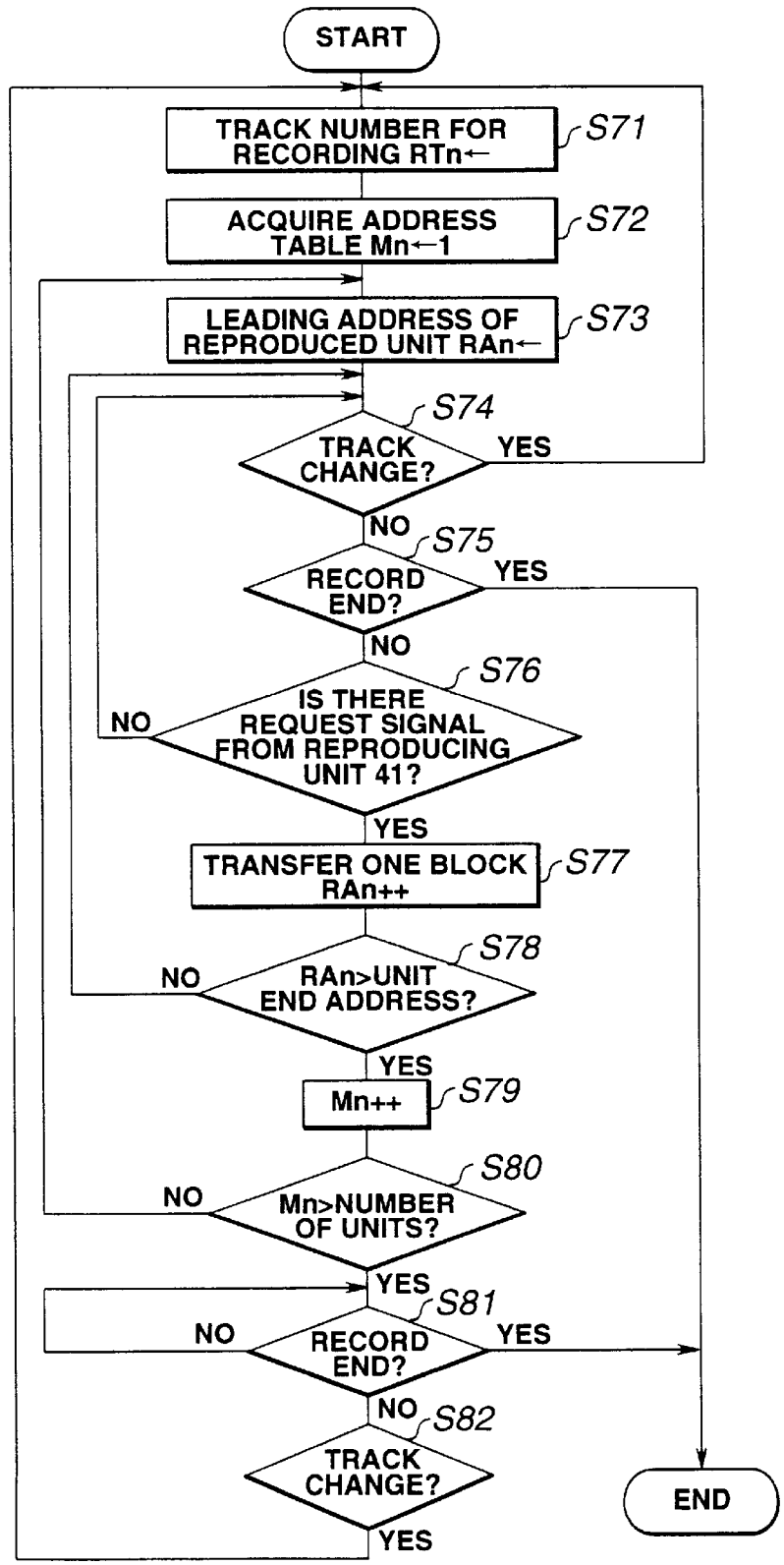
FIG. 28 is a flowchart for illustrating the sequence of processing for monitoring by expanding compressed data of a portion of the audio program which is being recorded and which is set from the audio transfer unit 10 to the reproducing unit 41.

FIG. 28 is a flowchart for illustrating the control contents of the audio transfer unit 10 for the case in which ATRAC data of plural tracks are recorded from the audio transfer unit 10 to the recording unit 20 on the optical disc D and in which specifically an optional portion of the track of the furnished ATRAC data is furnished to the reproducing unit 41. The contents of transmission processing of the ATRAC data from the audio transfer unit 10 to the recording unit 20 are the same as the processing of steps S51 to S57 shown in FIG. 24A.

When reproducing the reproducing processing for ATRAC data, the audio transfer unit 10 performs the processing of steps S71 to S82 shown in FIG. 28.

At step S71, the audio transfer unit 10 sets the playback track number RTn in a track for recording, that is a user-selected track. On setting the reproducing track number RTn, the audio transfer unit 10 proceeds to step S72.

At step S72, the main controller 11 of the audio transfer unit 10 acquirers an address table from the server 12 to store the table in, for example, an internal memory. The audio transfer unit 10 then sets the unit number of a unit for reproduction to 1 before proceeding to step S73.

At step S73, the audio transfer unit 10 sets the compressed reproducing address RAn in the leading end address of the reproducing unit. On setting the compressed reproducing address RAn, the audio transfer unit 10 proceeds to step S74.

At step S74, it is judged whether or not the track for recording has been changed, that is whether or not the processing at step S56 shown in FIG. 24A has been updated. If the track is judged to have been changed, the processing as from step S71 is repeated. If otherwise, the audio transfer unit 10 proceeds to step S75.

At step S75, it is judged whether or not recording has come to a close, that is whether or not the processing of steps S51 to S57 shown in FIG. 24A has come to a close. If the recording is judged to have come to a close, reproducing processing is terminated. If otherwise, the audio transfer unit 10 proceeds to step S76.

At step S76, the audio transfer unit 10 checks whether or not there is a request signal (Data Req) from the reproducing unit 41. If there is no request signal (Data Req), the audio transfer unit 10 reverts to step S74 to dwell at the steps S74, S75 and S76 until the track change, recording end or issuance of the request signal (Data Req). If there is issued the request signal (Data Req), the audio transfer unit 10 proceeds to step S77.

At step S77, the audio transfer unit 10 sends the ATRAC data of the block of the compressed reproducing address RAn to the reproducing unit 41. The audio transfer unit 10 increments the compressed reproducing address RAn by 1 before proceeding to step S78.

At step S78, the audio transfer unit 10 judges whether or not the compressed reproducing address RAn is larger than the unit end address. That is, it is judged whether or not the reproducing processing for the unit being reproduced has come to a close. If the compressed reproducing address RAn is found not to be larger than the unit end address, the processing as from step S74 is repeated. If otherwise, the audio transfer unit 10 proceeds to step S79.

At step S79, the audio transfer unit 10 increments the unit number Mn by 1 to then proceed to step S80.

At step S81, it is judged whether or not recording has come to a close. If the recording is judged to have come to a close, the reproducing processing is terminated. If otherwise, the audio transfer unit 10 proceeds to step S82.

At step S82, it is judged whether or not the recording track has been changed. If the track is judged to have been changed, the audio transfer unit 10 repeats the processing as from step S71 and, if otherwise, the processing of step S81 is repeated.

With the audio dubbing system 40, as described above, portions of the ATRAC data recorded by the recording unit 20 can be selected and reproduced to permit monitoring of audio data being recorded during the recording.

With the audio dubbing system 40, other track(s) can be reproduced by specifying the other track(s) on the address table. For example, a musical number of the artist, whose musical number is being recorded, can be reproduced. By displaying the contents of the address table on the display unit 14 to permit the user to select the portion desired to be reproduced by the user, the ATRAC data desired by the user can be reproduced.

Next, with the audio dubbing system 40, still pictures, moving pictures or text data are reproduced as pertinent data for the ATRAC data recorded on the optical disc D by the pertinent information reproducing unit 46, in addition to or in place of reproducing the ATRAC data recorded on the optical disc D by the reproducing unit 41.

Specifically, the server 12 holds on memory the photo of the artist performing the track and an image picture of the track as bit map data in association with each stored track. The server 12 also holds on memory the text data specifying the words of the track and the personal record of the artist. If the photo of the artist or the moving picture is on the video CD or on the home page on the Internet, the server 12 holds on memory the chapter numbers of the video CD or the home page addresses.

For recording the user-selected track on the optical disc D, the main controller 11 of the audio transfer unit 10 reads out the ATRAC data from the server 12 to furnish the read-out data to the recording unit 20. The main controller 11 refers at this time to the table for the pertinent information shown in FIG. 29 to furnish the contents of the information specified on the table of the associated track to the pertinent information reproducing unit 46.

If there is bit map data, the main controller 11 of the audio transfer unit 10 acquires the file from the server 12 to supply the acquired data to the printer device 47 or the display 48 of the pertinent information reproducing unit 46. If the bit map data is furnished, the printer device 47 of the pertinent information reproducing unit 46 prints out the bit map data on paper sheets, responsive to the user actuation, to furnish the printed data to the user. If fed with the bit map data, the display 48 of the pertinent information reproducing unit 46 displays the bit map data responsive to the user actuation.

If there is text data, the main controller 11 of the audio transfer unit 10 acquires the file from the server 12 to send the file to the printer device 47 or the display 48 of the pertinent information reproducing unit 46. If the bit map data is furnished, the printer device 47 of the pertinent information reproducing unit 46 prints out the bit map data on paper sheets, responsive to the user actuation, to furnish the printed data to the user. If fed with the text data, the display 48 of the pertinent information reproducing unit 46 displays the text data responsive to the user actuation.

If there is the chapter number specifying the playback position of the video CD or the DVD, the main controller 11 of the audio transfer unit 10 acquires the video data of the chapter number from the optical disc drive device 45 to furnish the data to the display 48 and to the speaker 49 of the pertinent information reproducing unit 46. If the picture data is furnished, the printer device 47 of the pertinent information reproducing unit 46 is responsive to user actuation to display the moving picture.

If there is a uniform resource locator (URL) which is the address of the WWW server, the main controller 11 of the audio transfer unit 10 acquires the information of the address from the home page via a communication interface 44 to send the acquired information to the display 48 and the speaker 49 of the pertinent information reproducing unit 46. When fed with the WWW server information, the display 48 of the pertinent information reproducing unit 46 is responsive to user actuation to display the moving picture.

With the audio dubbing system 40, as described above, the picture, audio data or the text data stored in the server 12 or the information from the Internet network can be acquired via the CD-ROM, video CD or the transmission medium as other recording mediums can be acquired during the recording of the ATRAC data on the optical disc D. Thus, with the audio dubbing system 40, the picture or the message of the artist singing the musical number can be represented on the display 48 during recording the ATRAC data on the optical disc D. Alternatively, the words of the musical number or the profile of the artist can be furnished by the printer device 47. Since there is provided the optical disc drive device for optical discs, such as video CD or DVD, promotion images of the artist can be displayed, or the artist information can be acquired via the transmission medium and the communication network 44 so as to be furnished to the user.

By this configuration, compressed audio data with a smaller data volume can be connected to the main controller from the server 12 of FIG. 20 by a network of relative low transfer rate, while the pertinent information of a larger data volume than the compressed audio data, such as the image or the message of the performing artist, can be supplied from the optical disc to enable data or information to be furnished without dependancy on the transfer rate.

In FIGS. 1 and 20, the server 12 is shown as being provided in the inside of the audio transmission unit 10. It is however possible to provide the server 12 in an information center located at a remote place and to interconnect the server to the audio transmission unit 10 over ISDN or analog telephone networks to unify the recording unit 20 with a block corresponding to the audio transmission unit 10 of FIG. 1 freed of the server 12.

In FIG. 20, the artist information, such as an image, supplied over the communication interface 44, can also be supplied from the remote server 12.

Although the foregoing description has been made for the case of recording audio data on a magneto-optical disc, the present invention may also be applied to recording of video data instead of audio data. The recording medium may also be a recording medium other than the magneto-optical disc if the recording medium is capable of random accessing.

What is claimed is:

1. A dubbing system, comprising:
   storage means for storing a plurality of audio programs compressed by predetermined compression processing;
   selection means for selecting a desired one of said compressed audio programs from the plurality of audio programs;
   transferring means for transferring the compressed audio program selected by the selection means;
   expanding means for expanding one of said plurality of audio programs supplied from the storage means;
   recording means for recording the predetermined audio program supplied from the transferring means; and
   monitoring means for monitoring the expanded audio program supplied from the expanding means while the predetermined audio program is being recorded on a recording medium.

2. The dubbing system as set forth in claim 1, wherein the audio program being expanded corresponds to the audio program being recorded on the recording medium.

3. The dubbing system as set forth in claim 1, wherein the audio program being expanded corresponds to a candidate program to be recorded on the recording medium.

4. The dubbing system as set forth in claim 1, wherein a portion of the audio program expanded by the expanding means has contents and the expansion permits comprehension of the contents.

5. The dubbing system as set forth in claim 2, wherein the audio program expanded by the expanding means has a digest and permits comprehension of the digest by expanding compressed data of plural sites of a sole audio program.

6. The dubbing system as set forth in claim 1, further comprising:
   setting means for setting portions having compressed data for expansion for a pre-set audio program; wherein
      the expanding means performs expansion on the compressed data of the portions as set by the setting means.

7. The dubbing system as set forth in claim 1, wherein said audio programs each have pertinent information and further comprising:
   reproducing means for reproducing the delivered pertinent information associated with the selected audio program;
   wherein the pertinent information reproduced by the reproducing means is reproduced during recording of a predetermined audio program on the recording medium.

8. The dubbing system as set forth in claim 7, wherein the reproducing means furnishing the pertinent information is an optical disc reproducing device for reproducing an optical disc forming the recording medium and having picture information recorded thereon.

9. The dubbing system as set forth in claim 7, wherein a control signal is appended to and transferred with the furnished audio program and wherein the reproducing means reproduces the pertinent information relevant to the furnished audio program based on the control signal during recording of the selected audio program on the recording medium.

10. The dubbing system as set forth in claim 9, wherein the control signal is an address of a uniform resource locator for internet connection.

11. A dubbing method, comprising the steps of:
   selecting a desired compressed audio program from a plurality of compressed audio programs stored in a memory;
   receiving the desired compressed audio program from a server as selected by the step of selecting;
   expanding one of the plurality of selected compressed audio programs supplied from the server and producing an expanded audio program;
   recording the compressed audio program supplied from the server; and
   monitoring the expanded audio program while the selected compressed audio program is being recorded on a recording medium.

12. The dubbing method as set forth in claim 11, wherein the expanded audio program corresponds to the recorded audio program.

13. The dubbing method as set forth in claim 11, wherein the expanded audio program corresponds to a candidate audio program to be recorded next time.

14. The dubbing method as set forth in claim 12, wherein each compressed audio program has a digest and the expanded audio program corresponds to a part of the compressed audio program to be recorded, whereby a user can grasp the digest of the compressed audio program to be recorded.

15. The dubbing method as set forth in claim 12, wherein each compressed audio program has a digest and the expanded audio program corresponds to discrete plural parts of the compressed audio program to be recorded, whereby the user can grasp the digest of the compressed audio program to be recorded.

16. The dubbing method as set forth in claim 14, wherein the part of the compressed audio program to be expanded is selected by the user, whereby the user can grasp the digest of the compressed audio program to be recorded.

* * * * *